US012588042B2

(12) United States Patent
Decotignie et al.

(10) Patent No.: US 12,588,042 B2
(45) Date of Patent: Mar. 24, 2026

(54) METHOD FOR DISTRIBUTED COMPUTE OPERATION ACROSS CONNECTED DEVICES

(71) Applicant: QUALCOMM Incorporated, San Diego, CA (US)

(72) Inventors: Philippe Decotignie, Markham (CA); Shishir Gupta, San Jose, CA (US); Ziad Asghar, San Diego, CA (US); Paul Torres, San Diego, CA (US); Leonid Sheynblat, Hillsborough, CA (US); Miran Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 17/823,095

(22) Filed: Aug. 30, 2022

(65) Prior Publication Data

US 2024/0073935 A1     Feb. 29, 2024

(51) Int. Cl.
*H04W 72/51*          (2023.01)
*H04M 3/493*          (2006.01)
          (Continued)

(52) U.S. Cl.
CPC ........... *H04W 72/51* (2023.01); *H04W 84/18* (2013.01)

(58) Field of Classification Search
CPC ..... H04W 88/02; H04W 84/12; H04W 40/04; H04W 40/10; H04W 40/246; H04L 43/16; H04L 41/0681; H04L 47/29
          (Continued)

(56) References Cited

U.S. PATENT DOCUMENTS 11,520,677 B1 *  12/2022  Arazi .................. G06F 11/3065
2016/0157221 A1    6/2016  Kim et al.
                    (Continued)

OTHER PUBLICATIONS

International Search Report and Written Opinion—PCT/US2023/026311—ISA/EPO—Oct. 2, 2023. 15 pages.
                    (Continued)

*Primary Examiner* — Marcus Smith
*Assistant Examiner* — Jason A Harley
(74) *Attorney, Agent, or Firm* — Muncy, Geissler, Olds & Lowe, P.C.

(57)          ABSTRACT

Various embodiments include methods and implementing computing devices, for distributing compute operation across connected wired or wireless computing devices. Various embodiments may include establishing an ad hoc communication connection with a second computing device, in which the ad hoc communication connection is part of a network of a plurality of wired or wireless computing devices communicatively connected via a plurality of ad hoc communication connections, receiving context information of the second wired or computing device via the ad hoc communication connection, selecting at least one sensor wired or wireless computing device from the plurality of wired or wireless computing devices, selecting at least one execution wired or wireless computing device from the plurality of wired or wireless computing devices, assigning a data gathering part of a work item to the sensor computing device, and assigning an execution part of the work item to the execution wired or wireless computing device.

30 Claims, 18 Drawing Sheets

(51) Int. Cl.

| | |
|---|---|
| *H04W 4/02* | (2018.01) |
| *H04W 4/029* | (2018.01) |
| *H04W 40/00* | (2009.01) |
| *H04W 48/18* | (2009.01) |
| *H04W 84/18* | (2009.01) |

(58) Field of Classification Search
USPC ................................................... 370/252, 278
See application file for complete search history.

(56) References Cited

U.S. PATENT DOCUMENTS

| | | | |
|---|---|---|---|
| 2018/0331940 A1 | 11/2018 | Jadhav et al. | |
| 2019/0042318 A1 | 2/2019 | Ljung et al. | |
| 2019/0266496 A1* | 8/2019 | Florissi | ................ G06Q 20/065 |
| 2019/0306854 A1 | 10/2019 | Ahmadi | |
| 2020/0293423 A1 | 9/2020 | Carbonell et al. | |
| 2021/0007023 A1 | 1/2021 | Umapathy et al. | |
| 2021/0014114 A1 | 1/2021 | Doshi et al. | |
| 2021/0014301 A1* | 1/2021 | Doshi | ..................... H04L 67/10 |
| 2021/0092786 A1* | 3/2021 | Uddin | ................... H04W 76/15 |
| 2022/0043946 A1* | 2/2022 | Aoki | .................... G06F 9/45558 |
| 2022/0078226 A1 | 3/2022 | Sabella et al. | |
| 2022/0148556 A1* | 5/2022 | Kwiatkowska | ......... G10L 15/16 |

OTHER PUBLICATIONS

Li B., et al., "Reliability and Capability Based Computation Offloading Strategy for Vehicular ad hoc Clouds", Journal of Cloud Computing: Advances, Systems and Applications, 2019, URL: https://doi.org/10.1186/s13677-019-0147-6, pp. 1-14.

* cited by examiner

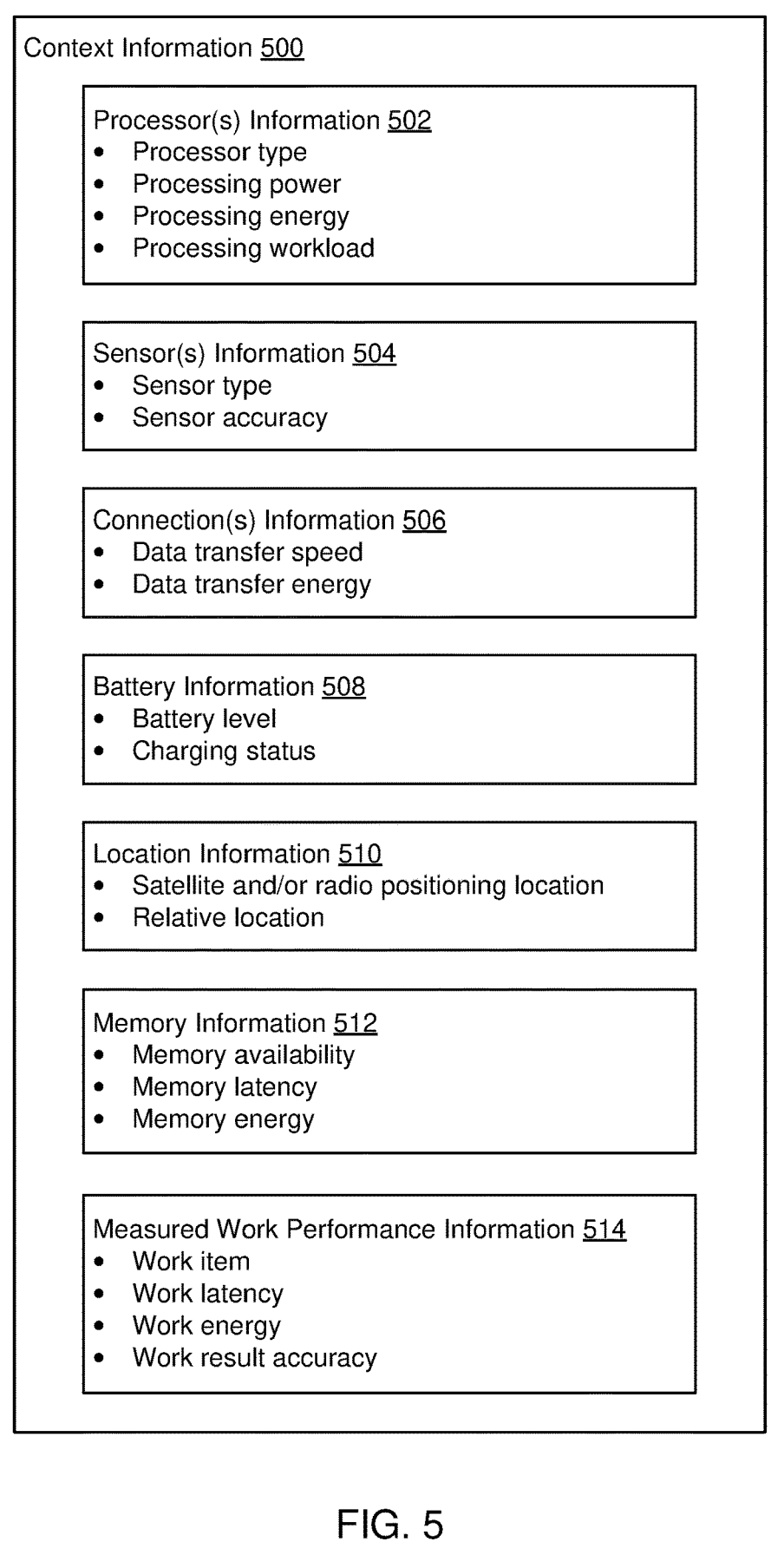

Context Information 500

Processor(s) Information 502
- Processor type
- Processing power
- Processing energy
- Processing workload Sensor(s) Information 504
- Sensor type
- Sensor accuracy Connection(s) Information 506
- Data transfer speed
- Data transfer energy Battery Information 508
- Battery level
- Charging status Location Information 510
- Satellite and/or radio positioning location
- Relative location Memory Information 512
- Memory availability
- Memory latency
- Memory energy Measured Work Performance Information 514
- Work item
- Work latency
- Work energy
- Work result accuracy

FIG. 5

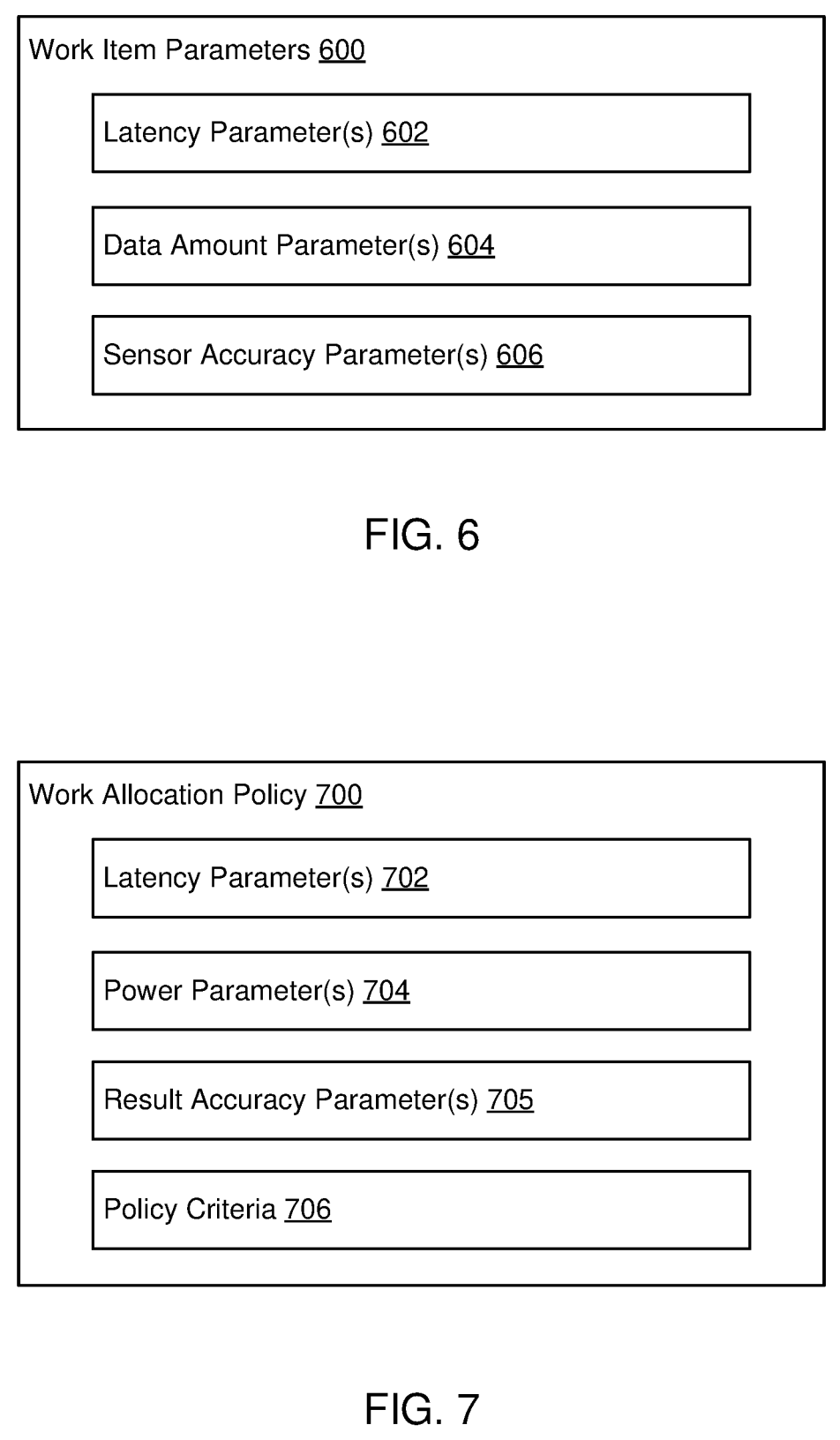

Work Item Parameters 600

Latency Parameter(s) 602

Data Amount Parameter(s) 604

Sensor Accuracy Parameter(s) 606

FIG. 6

Work Allocation Policy 700

Latency Parameter(s) 702

Power Parameter(s) 704

Result Accuracy Parameter(s) 705

Policy Criteria 706

FIG. 7

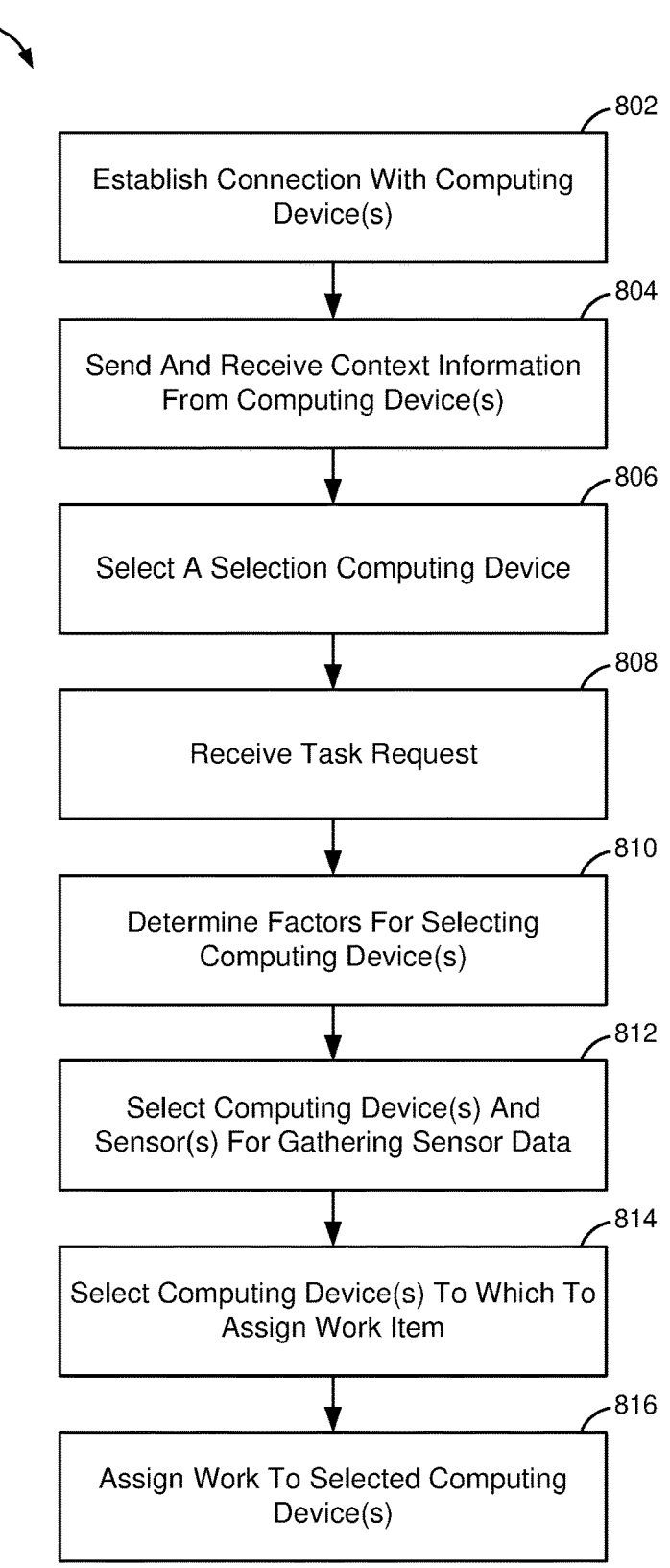

800

802
Establish Connection With Computing Device(s)

804
Send And Receive Context Information From Computing Device(s)

806
Select A Selection Computing Device

808
Receive Task Request

810
Determine Factors For Selecting Computing Device(s)

812
Select Computing Device(s) And Sensor(s) For Gathering Sensor Data

814
Select Computing Device(s) To Which To Assign Work Item

816
Assign Work To Selected Computing Device(s)

Compare Sensor(s) Information To
Sensor Type(s) For Work Item

904

Identify Sensor(s) Having Sensor
Type(s) For Work Item

906

Identify Computing Device(s) With
Sensor(s) Having Sensor Type(s) For
Work Item

908

Identify accuracy Of Sensor(s) Having
Sensor Type(s) For Work Item

900b

910

Compare Sensor(s) Information To
Threshold Accuracy

912

Identify Sensor(s) Having At Least
Threshold Accuracy

914

Select Computing Device(s) With
Sensor(s) Having At Least Threshold
Accuracy

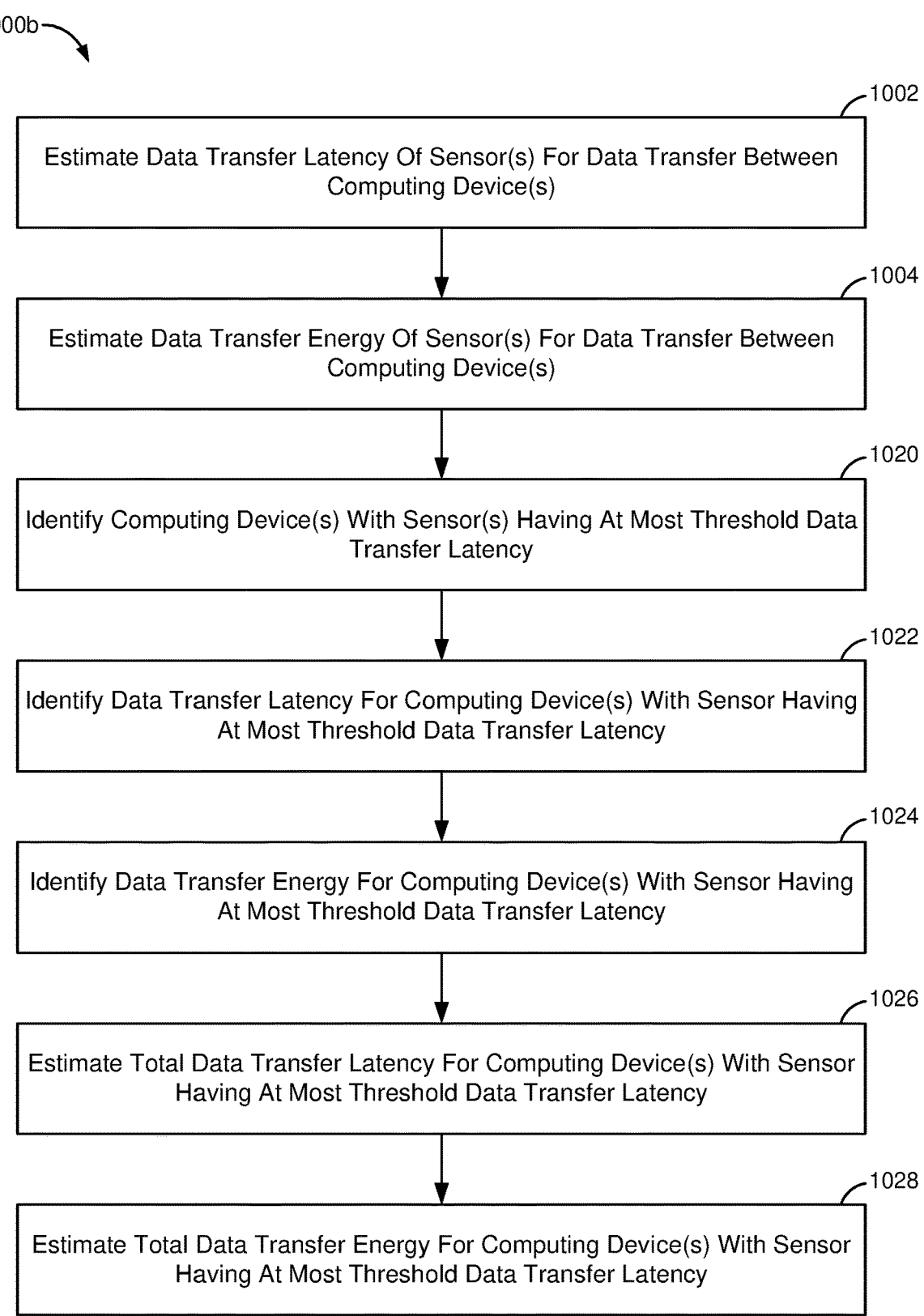

1000b

1002

Estimate Data Transfer Latency Of Sensor(s) For Data Transfer Between Computing Device(s)

1004

Estimate Data Transfer Energy Of Sensor(s) For Data Transfer Between Computing Device(s)

1020

Identify Computing Device(s) With Sensor(s) Having At Most Threshold Data Transfer Latency

1022

Identify Data Transfer Latency For Computing Device(s) With Sensor Having At Most Threshold Data Transfer Latency

1024

Identify Data Transfer Energy For Computing Device(s) With Sensor Having At Most Threshold Data Transfer Latency

1026

Estimate Total Data Transfer Latency For Computing Device(s) With Sensor Having At Most Threshold Data Transfer Latency

1028

Estimate Total Data Transfer Energy For Computing Device(s) With Sensor Having At Most Threshold Data Transfer Latency

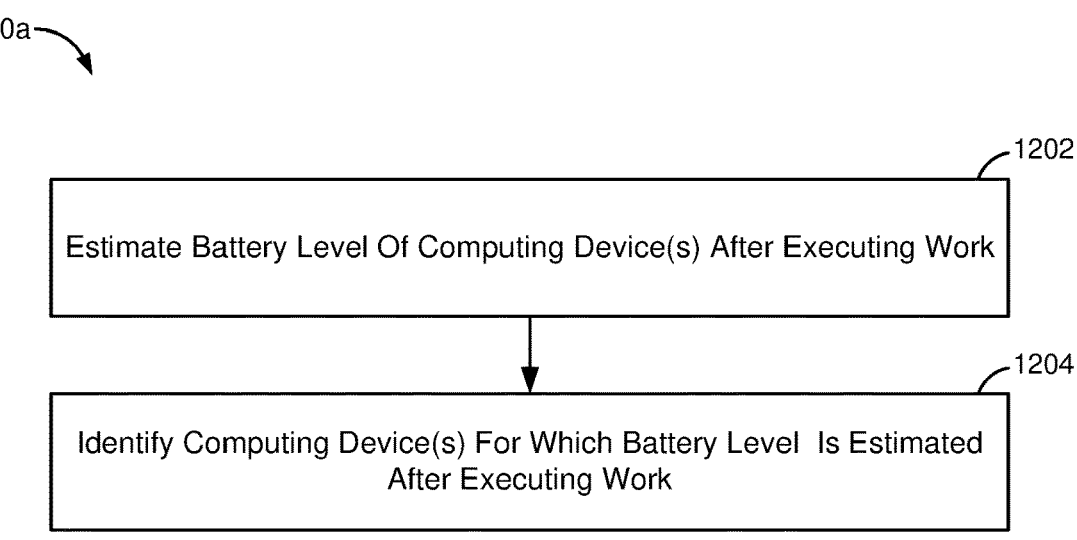

1202

Estimate Battery Level Of Computing Device(s) After Executing Work

1204

Identify Computing Device(s) For Which Battery Level Is Estimated After Executing Work

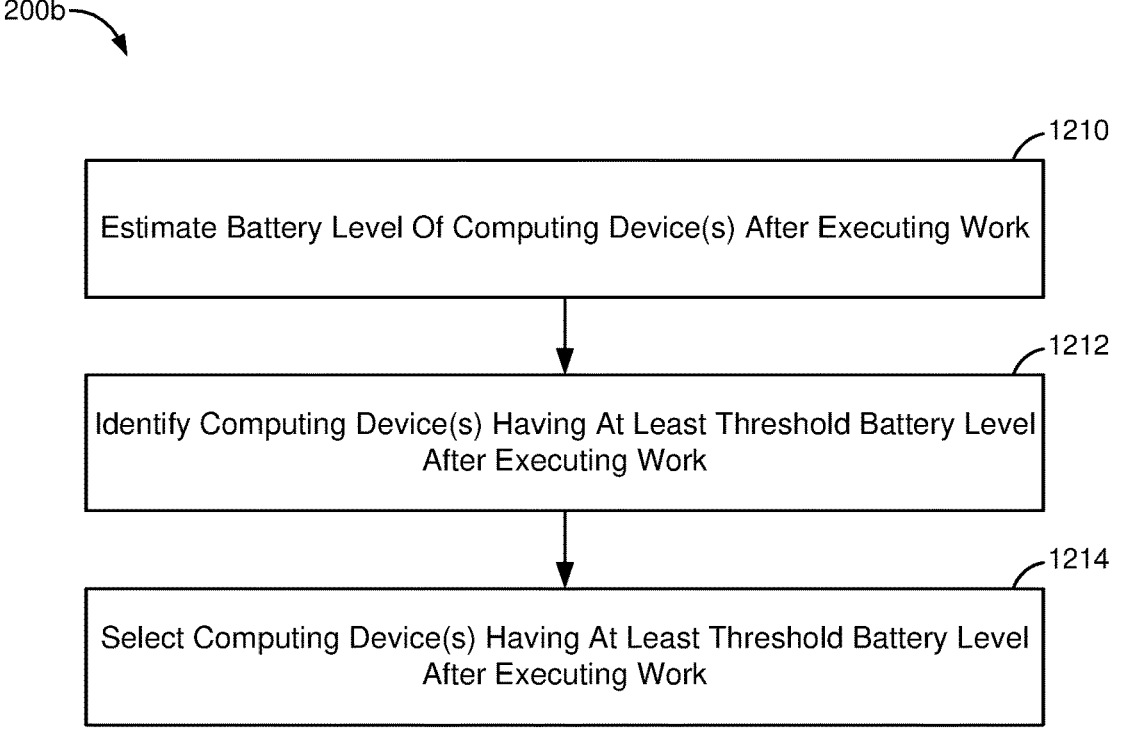

1210

Estimate Battery Level Of Computing Device(s) After Executing Work

1212

Identify Computing Device(s) Having At Least Threshold Battery Level After Executing Work

1214

Select Computing Device(s) Having At Least Threshold Battery Level After Executing Work

Identify Characteristics Of Computing Device(s) For Executing Work

1304

Identify Computing Device(s) Having Characteristics For Executing Work Achieving Criteria For Executing Work

1306

Select Computing Device(s) From Computing Device(s) Having Characteristics For Executing Work Achieving Criteria For Executing Work 1300b

METHOD FOR DISTRIBUTED COMPUTE OPERATION ACROSS CONNECTED DEVICES

BACKGROUND

Computing device users commonly use and are in range of multiple computing devices with wireless communication capabilities that users use both alternatively and simultaneously for a variety of situations and usage models. Generally, each computing device performs tasks for which it configured based on a programmed set of tasks specific for each device. For some use cases, devices are paired with each other and work together while performing their own specific tasks. A common example of this includes a smartphone that retrieves media content from local or remote storage and sends signals of the media content to connected earbuds used to listen to audio. However, even in paired situations, devices execute each use case as designed, in a fixed processing model that is optimized from the perspective of each device.

SUMMARY

Various aspects include methods, and systems and devices for performing the methods, for distributing compute operation across connected wired or wireless computing devices. Various aspects may be performed in a processor of a first computing device, and include establishing an ad hoc wireless communication connection with a second computing device, in which the ad hoc communication connection is part of a network, such as a wireless personal area network (WPAN) of a plurality of computing devices communicatively connected via a plurality of ad hoc communication connections, receiving context information of the second computing device via the ad hoc communication connection, selecting at least one sensor computing device from the plurality of computing devices, selecting at least one execution computing device from the plurality of computing devices, assigning a data gathering part of a work item to the at least one sensor computing device; and assigning an execution part of the work item to the at least one execution computing device.

Some aspects may further include determining factors for selecting at least one computing device based on a plurality of context data of the plurality of computing devices, in which: selecting the at least one sensor computing device may include selecting the at least one sensor computing device using factors determined from context data of the at least one sensor computing device and context data of the at least one execution computing device; and selecting the at least one execution computing device may include selecting the at least one execution computing device using factors determined from context data of the at least one sensor computing device and context data of the at least one execution computing device. In some aspects, determining the factors for selecting the at least one computing device based on the plurality of context data of the plurality of computing devices may include: identifying an accuracy of results for executing the work item based on an accuracy of at least one sensor at each of at least two computing devices of the plurality of computing devices, identifying an accumulated latency for executing the work item by at least one computing device of the plurality of computing devices; and identifying an accumulated energy use for executing the work item by at least one computing devices of the plurality of computing devices.

In some aspects, selecting the at least one sensor computing device using the factors determined from the context data of the at least one sensor computing device and the context data of the at least one execution computing device may include selecting the at least one sensor computing device based on criteria of the accuracy of results for executing the work item, the accumulated latency for executing the work item, and the accumulated energy use for executing the work item; and selecting the at least one execution wireless computing device using the factors determined from the context data of the at least one sensor computing device and the context data of the at least one execution computing device may include selecting the at least one execution computing device based on the criteria of the accuracy of results for executing the work item, the accumulated latency for executing the work item, and the accumulated energy use for executing the work item. In some aspects, the criteria of the accuracy of results for executing the work item, the accumulated latency for executing the work item, and the accumulated energy use for executing the work item may be based on weighted values for the accuracy of results for executing the work item, the accumulated latency for executing the work item, and the accumulated energy use for executing the work item.

In some aspects, determining the factors for selecting the at least one computing device based on the plurality of context data of the plurality of computing devices may include: calculating at least one estimate of data transfer latency between the at least one sensor computing device and the at least one execution wireless computing device for executing the work item; calculating at least one estimate of processing latency of the at least one execution computing device for executing the work item; and calculating at least one estimate of total latency for executing the work item based on the at least one estimate of data transfer latency and the at least one estimate of processing latency. Such aspects may further include selecting the at least one computing device having the at least one estimate of total latency that is at most a threshold latency for executing the work item.

In some aspects, determining the factors for selecting the at least one computing device based on the plurality of context data of the plurality of computing devices may include: calculating at least one estimate of data transfer energy between the at least one sensor computing device and the at least one execution computing device for executing the work item; calculating at least one estimate of processing energy of the at least one execution computing device for executing the work item; and calculating at least one estimate of total energy for executing the work item based on the at least one estimate of data transfer energy and the at least one estimate of processing energy. Such aspects may further include selecting the at least one wireless computing device having the at least one estimate of total energy that is at most a threshold energy for executing the work item. In such aspects, determining the factors for selecting the at least one computing device based on the plurality of context data of the plurality of computing devices may include estimating a battery level of the at least one execution wireless computing device following executing the work item using the at least one estimate of total energy for executing the work item. Such aspects may further include selecting the at least one computing device having the at least one estimate of the battery level of the at least one execution computing device following executing the work item that is at least a threshold battery level following executing the work item.

Some aspects may further include identifying at least one sensor of the at least one sensor computing device having at least a threshold sensor accuracy using sensor accuracy information from the context data of the at least one sensor computing device, in which selecting the at least one sensor computing device may include selecting the at least one sensor computing device having the at least one sensor having at least the threshold sensor accuracy.

Further aspects may include a computing device having a processor configured to perform operations of any of the methods summarized above. Further aspects may include a computing device having means for performing functions of any of the methods summarized above. Further aspects may include a non-transitory, processor-readable medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 5 is a component block diagram illustrating an example of a context information for a wired or wireless computing device configured to implement distributed compute operation across connected wired or wireless computing devices in accordance with various embodiments.

FIG. 6 is a schematic block diagram illustrating an example of a set of work parameters for executing work by a wired or wireless computing device configured to implement distributed compute operation across connected wired or wireless computing devices in accordance with various embodiments.

FIG. 7 is a schematic block diagram illustrating an example of a work allocation policy for executing work by a wired or wireless computing device configured to implement distributed compute operation across connected wired or wireless computing devices in accordance with various embodiments.

FIG. 8 is a process flow diagram illustrating an example of a method for distributing compute operation across connected wired or wireless computing devices in accordance with various embodiments.

FIGS. 10A and 10B are process flow diagrams illustrating examples of methods for estimating data transfer latency and energy for distributing compute operation across connected wired or wireless computing devices in accordance with various embodiments.

FIGS. 12A and 12B are process flow diagrams illustrating examples of methods for estimating battery level for distributing compute operation across connected wired or wireless computing devices in accordance with various embodiments.

Like reference numbers and designations in the various drawings indicate like elements.

DETAILED DESCRIPTION

Figure 1:
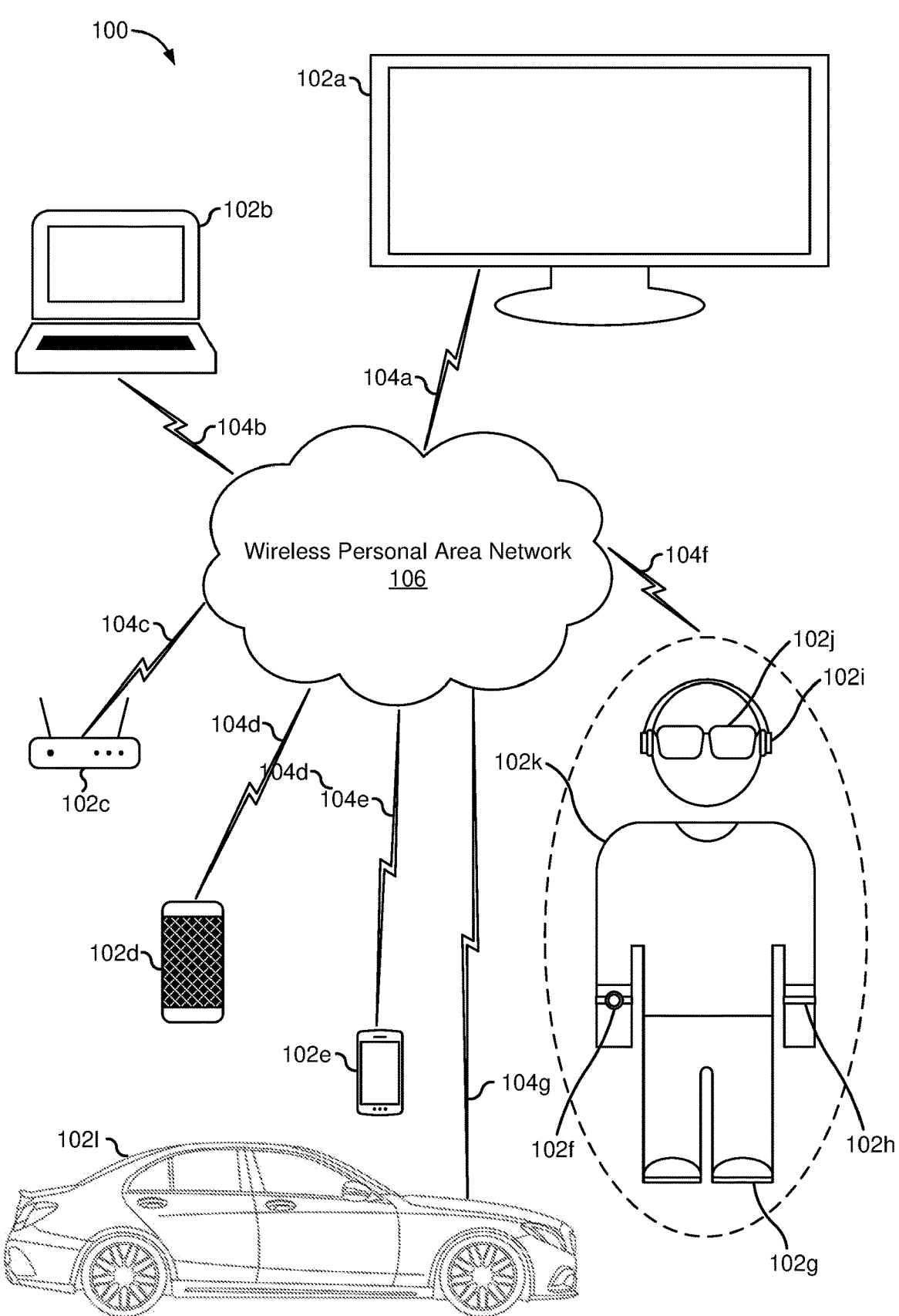
FIG. 1 is a system block diagram illustrating an example of a communication system suitable for implementing any of the various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims. The following description is directed to certain embodiments for the purposes of describing the innovative aspects of this disclosure. However, a person having ordinary skill in the art will readily recognize that the teachings herein may be applied in a multitude of different ways.

Various embodiments provide methods, and devices and systems for implementing such methods, for distributing compute operation across wired or wireless computing devices connected via a network, such as a wireless personal area network (WPAN). A wired and/or wireless computing device may be configured to select one or more networked wired and/or wireless computing devices to which to assign part of a compute operation. Selection of the one or more network-connected wired and/or wireless computing devices may be based on information of an operating context of the one or more network-connected wired and/or wireless computing devices, parameters for executing the part of the compute operation, and a policy for assigning part of a compute operation.

The term "computing device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as gaming consoles, wireless gaming controllers, wireless speakers, wireless headphones and earbuds, music and video players, satellite radios, etc.), wired- or wireless-network enabled Internet of Things (IoT) devices including smart meters/sensors, home automation hubs, smart speakers, large and small machinery and appliances for home or enterprise use, wireless communication elements within autonomous and semiautonomous vehicles, wired and/or wireless devices affixed to or incorporated into various mobile platforms, global positioning system devices, and similar electronic devices that include a memory, wired and/or wireless communication components and a programmable processor. While some embodiments and examples are described with reference to wireless computing devices in wireless networks, these descriptions are for illustrative purposes and are not intended to exclude embodiments implemented in computing devices communicating via wired networks or via a combination of wired and wireless networks.

Computing device may communicate via a variety of wired networks, such as ethernet. Computing device may communicate via a variety of wireless networks by transmitting and receiving radio frequency (RF) signals in a wireless personal area network (WPAN) via ad hoc connections with one or more WPAN-connected wireless computing devices, using, for example, Wi-Fi (e.g., Wi-Fi direct), Bluetooth, Bluetooth low energy, wireless USB, ZigBee, Ultra-wideband, and the like.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The terms "compute operation," "task," and "work" are used interchangeably herein to refer to at least a portion, including up to all, of a workload for executing a computer program by one or more wired and/or wireless computing devices. In some embodiments, a computer program may include multiple compute operations, tasks, or work items, of which one or more of the compute operations, tasks, or work items may be assigned to one or more wired and/or wireless computing devices in various combinations for execution, as described herein. For example, a compute operation, task, or work item of gathering sensor data may be assigned to a wired and/or wireless computing device for execution and a compute operation, task, or work item for processing the sensor data may be assigned to another wired and/or wireless computing device for execution.

Computing devices are generally configured to execute specific tasks for which each is configured based on programmed sets of tasks specific for each device. For some use cases, computing devices are paired with each other and work together via a wired or wireless communication connection while performing their own specific tasks. A common example of this includes a smartphone that retrieves media content from local or remote storage and sends signals of the media content to wired or wirelessly connected earbuds used to listen to audio. However, even in paired situations, devices execute each use case as designed, in a fixed processing model that is optimized from the perspective of each device. Such paired devices do not allocate the processing of some tasks to a device that has greater capability for completing the tasks.

Various embodiments include methods and data structures for allocating computing tasks among a number of connected wired and/or wireless computing devices to enable wired and/or wireless computing devices with greater capability to perform the tasks. The wired and/or wireless computing devices may include a selection wired and/or wireless computing devices that may be configured to assign computing tasks to one or more of the wired and/or wireless computing devices. The selection wired and/or wireless computing device may select one or more wired and/or wireless computing devices to provide sensor data and/or select one or more separate wired and/or wireless computing devices to perform a given computing task based on shared context information. In making the assignments, the wired and/or wireless computing device may use context information (e.g., sensor accuracy, latency, energy usage, battery level, memory, location, prior performance, etc.) regarding all of the wired and/or wireless computing devices. The context information may be provided by the wired and/or wireless computing devices when connected to one another. The selection wired and/or wireless computing device may use the shared context information to estimate the ability of each device to perform a computing task within performance criteria, and may select an execution wired and/or wireless computing device and allocate task execution to the selected execution wired and/or wireless computing device. The selected execution wired and/or wireless computing device may use its processing capabilities and sensor data from a sensor wired and/or wireless computing device to perform the assigned task before providing the results to the task to an appropriate one of the wired and/or wireless computing devices. As any of the wired and/or wireless computing devices may perform the role of the selection wired and/or wireless computing device, all the wired and/or wireless computing devices may be configured with the method and exchange device information with all other wired and/or wireless computing devices, and a first task performed may be selecting the selection wired and/or wireless computing device.

The selection wired and/or wireless computing device may estimate an ability of an execution wired and/or wireless computing device to achieve criteria for executing a task using data from a sensor wired and/or wireless computing device based on context information of the execution wired and/or wireless computing device and the sensor wired and/or wireless computing device. The selection wired and/or wireless computing device may select the execution wired and/or wireless computing device for allocating the task based on the estimated ability of the execution wired and/or wireless computing device being able to achieve the criteria for executing the task. Estimating the ability of an execution wired and/or wireless computing device to execute a task to achieve performance criteria may include determining whether context information of the sensor wired and/or wireless computing device indicate an ability to achieve a criterion of sensor accuracy for the task, determining whether context information of the execution wired and/or wireless computing device and the sensor wired and/or wireless computing device having an accurate sensor indicate an estimated ability to achieve a criterion of a power level resulting from execution of the task, and determining whether context information of the execution wired and/or wireless computing device and the sensor wired and/or wireless computing device having the accurate sensor indicate an estimated ability to achieve a criterion of latency for the task at a level lower than a threshold. Selecting the execution wired and/or wireless computing device for performing the task may include selecting the execution wired and/or wireless computing device based on the estimated ability to achieve the criterion of power level resulting from execution of the task and the estimated ability to achieve the criterion of latency for the task at the level lower than the threshold.

The various computing devices may connect to one another via various wired or wireless connections, such as local area wired networks, peer to peer wireless connections, ad hoc wired network connections, ad hoc wireless network connections, wireless local area network connections, and the like. When the computing devices connect, such as when a new computing device connects to a wired or wireless network connecting other computing devices, all wired and/or wireless computing devices may share with one another data structures that provide their respective context information, including: processor information, such as, processor type, processor power, processor energy consumption rate; sensor information, such as sensor type and sensor accuracy; connection information, such as data transfer rate from the sensor wired and/or wireless computing device to execution wired and/or wireless computing devices and data transfer energy consumption rate from the sensor wired and/or wireless computing device to execution wired and/or wireless computing devices; and/or battery information, such as battery charge state; location information; environmental information; work load information; and the like. The wired and/or wireless computing devices (or at least the selection wired and/or wireless computing device) may store in local memory the context information received from the other wired and/or wireless computing devices.

The selection wired and/or wireless computing device may use the shared context information that is stored in memory to select combinations of sensor wired and/or wireless computing devices and execution wired and/or wireless computing devices to perform particular tasks. The selection wired and/or wireless computing device may receive task requests from the wired and/or wireless computing devices (including itself) and then select sensor wired and/or wireless computing devices that may provide sensor data necessary to a given task and an execution wired and/or wireless computing device that may execute the given task using sensor data from the selected sensor wired and/or wireless computing device. The selection wired and/or wireless computing device can use sensor type and/or sensor accuracy criteria of tasks to compare with context information of sensor type and/or sensor accuracy of the wired and/or wireless computing devices to select the sensor of a sensor wired and/or wireless computing device to use in selecting the sensor wired and/or wireless computing device.

The selection wired and/or wireless computing device may use data transfer latency and/or data transfer energy context information between specified sensor wired and/or wireless computing devices and execution wired and/or wireless computing devices to determine a least data transfer latency among each sensor wired and/or wireless computing devices to each execution wired and/or wireless computing device, and a data transfer energy between each specified sensor wired and/or wireless computing device having the lowest data transfer latency and each execution wired and/or wireless computing device. The selection wired and/or wireless computing device may accumulate data transfer latency and data transfer energy for all selected sensor wired and/or wireless computing devices having the least data transfer latency and the execution wired and/or wireless computing device.

The selection wired and/or wireless computing device may use processing latency and/or processing energy context information of specified processors of execution wired and/or wireless computing devices to determine a least processing latency among all processors for each execution wired and/or wireless computing device and a processing energy of a fastest processor for each execution wired and/or wireless computing device.

The selection wired and/or wireless computing device may use battery level context information and the determinations of accumulated data transfer energy and processing energy of a fastest processor for each execution wired and/or wireless computing device to determine which execution wired and/or wireless computing device can achieve a criterion of power level resulting from execution of the task. The determination may be made using data based on specific pairings of the execution wired and/or wireless computing device and the selected sensor wired and/or wireless computing devices having the least data transfer latency. In some embodiments, determination of an execution wired and/or wireless computing device may also be a determination of a sensor of the sensor wired and/or wireless computing device having the least data transfer latency associated with the execution wired and/or wireless computing device.

The selection wired and/or wireless computing device may use the determinations of accumulated data transfer latency and the least processing latency among all processors for each execution wired and/or wireless computing device to determine which execution wired and/or wireless computing device can achieve a criterion of latency for the task at a level lower than a threshold. The determination may be made using data based on specific pairings of the execution wired and/or wireless computing device and the sensor wired and/or wireless computing devices having the least data transfer latency. Therefore, the determination of an execution wired and/or wireless computing device may include determining a combination of execution wired and/or wireless computing device and sensor wired and/or wireless computing devices among the available combinations of execution wired and/or wireless computing devices paired with sensor wired and/or wireless computing devices. This may include comparing the latency achieved by each combination of execution wired and/or wireless computing device and the sensor wired and/or wireless computing devices and selecting the greatest preforming combination.

FIG. 1 illustrates an example of a communication system 100 suitable for implementing any of the various embodiments. With reference to FIG. 1 the communication system may include any combination of at least two wired and/or wireless computing devices 102a, 102b, 102c, 102d, 102e, 102f, 102g, 102h, 102i, 102j, 102k, 102l communicatively connected via wired and/or wireless communication connections 104a, 104b, 104c, 104d, 104e, 104f, 104g forming a network, such as wireless personal area network (WPAN) 106. The WPAN 106 may include multiple ad hoc wireless communication connections 104a-104g between pairs of individual wireless computing devices 102a-102l.

The wireless computing devices 102a-102l may be configured to form ad hoc wireless communication connections 104a-104g between each other. The ad hoc wireless communication connections 104a-104g may be enabled using any of various radio frequency, wireless communication technologies (or radio access technologies), such as Wi-Fi (e.g., Wi-Fi direct), Bluetooth, Bluetooth low energy, wireless USB, ZigBee, Ultra-wideband, and the like. Each wireless computing device 102a-102l may be configured with hardware and software for implementing at least one wireless communication connections 104a-104g using at least one wireless communication technologies. For an example, a wireless computing device 102a-102l may be configured with hardware and software for implementing one or more wireless communication connections 104a-104g using one wireless communication technology. For another, example a wireless computing device 102a-102l may be configured with hardware and software for implementing at least two wireless communication connections 104a-104g using at least two wireless communication technologies. An ad hoc ad hoc wireless communication connection 104a-104g between a pair of wireless computing devices 102a-102l may be enabled by both wireless computing devices 102a-102l using compatible wireless communication technologies.

In the example communication system 100 illustrated in FIG. 1, example wireless computing devices 102a-102l may include, smart appliances 102a (e.g., a smart audio/visual equipment, a component of an indoor environment control system, a component of a security system, a kitchen appliance, a bathroom appliance, a lighting appliance, etc.), personal computing devices 102b (e.g., a laptop, a desktop, a gaming console, etc. and peripheral devices thereof), computer networking devices 102c (e.g., a router, an access point, a range extender, etc.), smart automation devices 102d (e.g., a smart speaker, an automation hub, etc.), personal mobile communication devices 102e (e.g., a smartphone, a tablet, etc.), wearable devices 102f-102k (e.g., a smartwatch, a shoe with a sensor, a fitness tracker, a wireless headphone and earbuds, smart glasses, clothing with a sensor, etc.), and connected vehicles (e.g., a vehicle with a wirelessly connectable infotainment system, occupant monitoring system, hotspot, safety system, automation system, V2X communication system, etc.). In the example communication system 100 illustrated in FIG. 1, the example wireless computing devices 102a-102l may communicatively connect via ad hoc wireless communication connections 104a-104g. The ad hoc wireless communication connections 104a-104g are shown connecting to the WPAN 106 for ease of illustration and clarity rather than showing each possible ad hoc wireless communication connection between pairs of wireless computing devices 102a-102l. The wireless computing devices 102f-102l are show as collectively having wireless communication connection 104f for ease of illustration and clarity rather than showing each possible wireless communication connection for each wireless computing device 102f-102l.

The example wireless computing devices 102a-102l and ad hoc wireless communication connections 104a-104g shown in FIG. 1 are for illustrative purposes and do not limit the scope of the claims to the number, kind, and/or combination of the example wireless computing devices 102a-102l and ad hoc wireless communication connections 104a-104g shown in FIG. 1.

Figure 2:
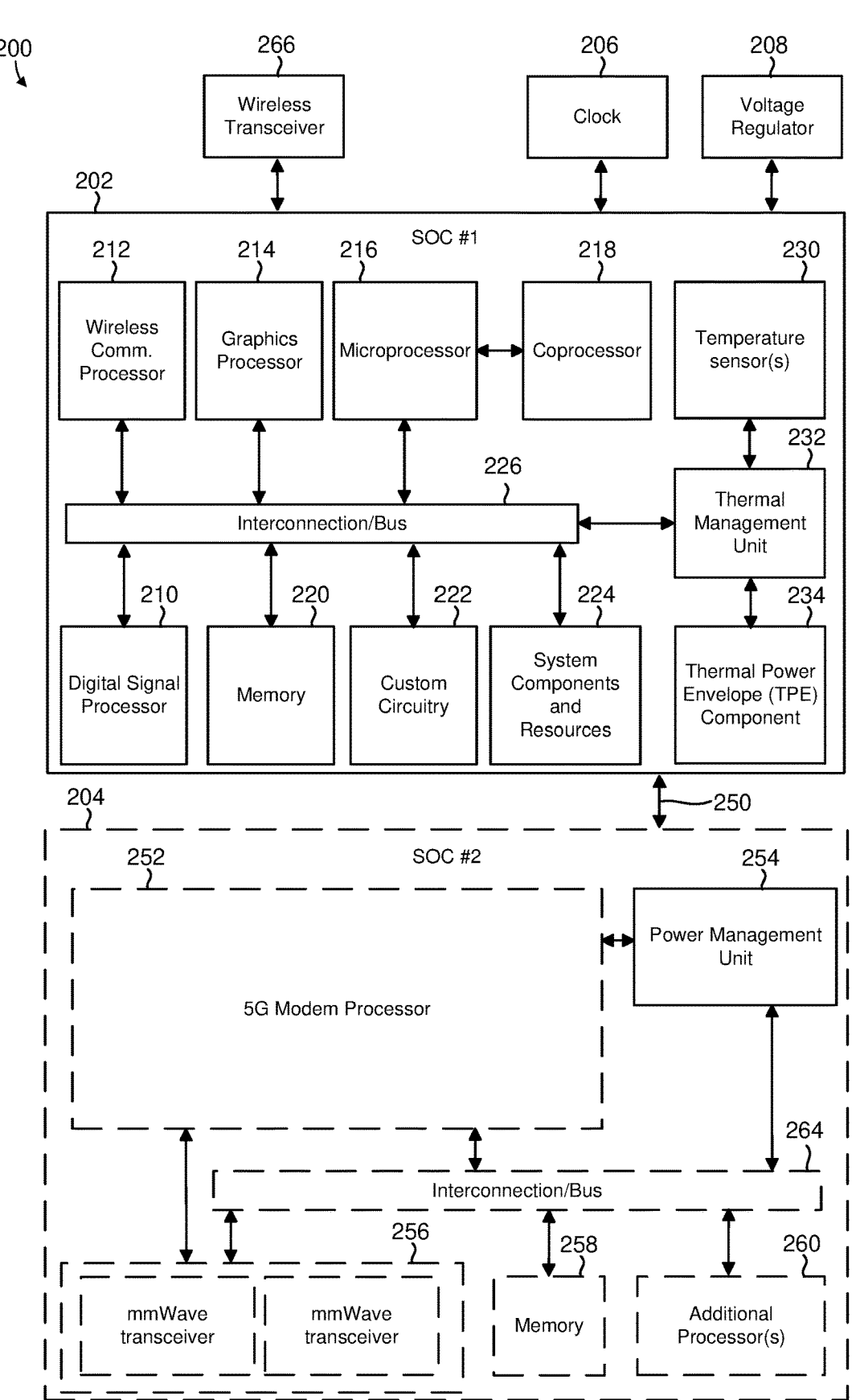
FIG. 2 is a component block diagram illustrating an example computing system suitable for implementing any of the various embodiments.

FIG. 2 is a component block diagram illustrating an example computing system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) may be implemented, in whole or in part, in a wired and/or wireless computing device (e.g., wired and/or wireless computing device 102a-102l in FIG. 1). The computing system 200 includes one or more SOCs 202, 204 coupled to a clock 206, a voltage regulator 208, and a wired or wireless transceiver 266 configured to send and receive wired or wireless communications via an antenna (not shown) to/from wired and/or wireless computing devices. In some embodiments, a first SOC 202 may operate as a central processing unit (CPU) of the wired and/or wireless computing device that carries out the instructions of software application programs by performing the arithmetic, logical, control and input/output (I/O) operations specified by the instructions. In some embodiments, a second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a communication (comm.) processor 212 (e.g., configured to implement functionality for wired and/or wireless communication technologies (or radio access technologies), a graphics processor 214, an microprocessor 216 (e.g., central processing unit (CPU), application processor, etc.), one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, a memory 258, and various additional processors 260, such as an applications processor, packet processor, etc.

Each processor 210, 212, 214, 216, 218, 252, 260 may include one or more cores, and each processor/core may perform operations independent of the other processors/ cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data of one or more sensors (not shown), analog-to-digital conversions, wired and/or wireless data transmissions, and for performing other specialized operations, such as encoding and decoding data packets, and processing encoded and decoded data packets. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wired and/or wireless computing device. The system components and resources 224 and/or custom circuitry 222 may also include circuitry to interface with peripheral devices, such as cameras, electronic displays, wired and/or wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof. The example computing system 200 shown in FIG. 2 is for illustrative purposes and does not limit the scope of the claims to the number, kind, combination, and/or arrangement of the components of example computing system 200 shown in FIG. 2.

Figure 3:
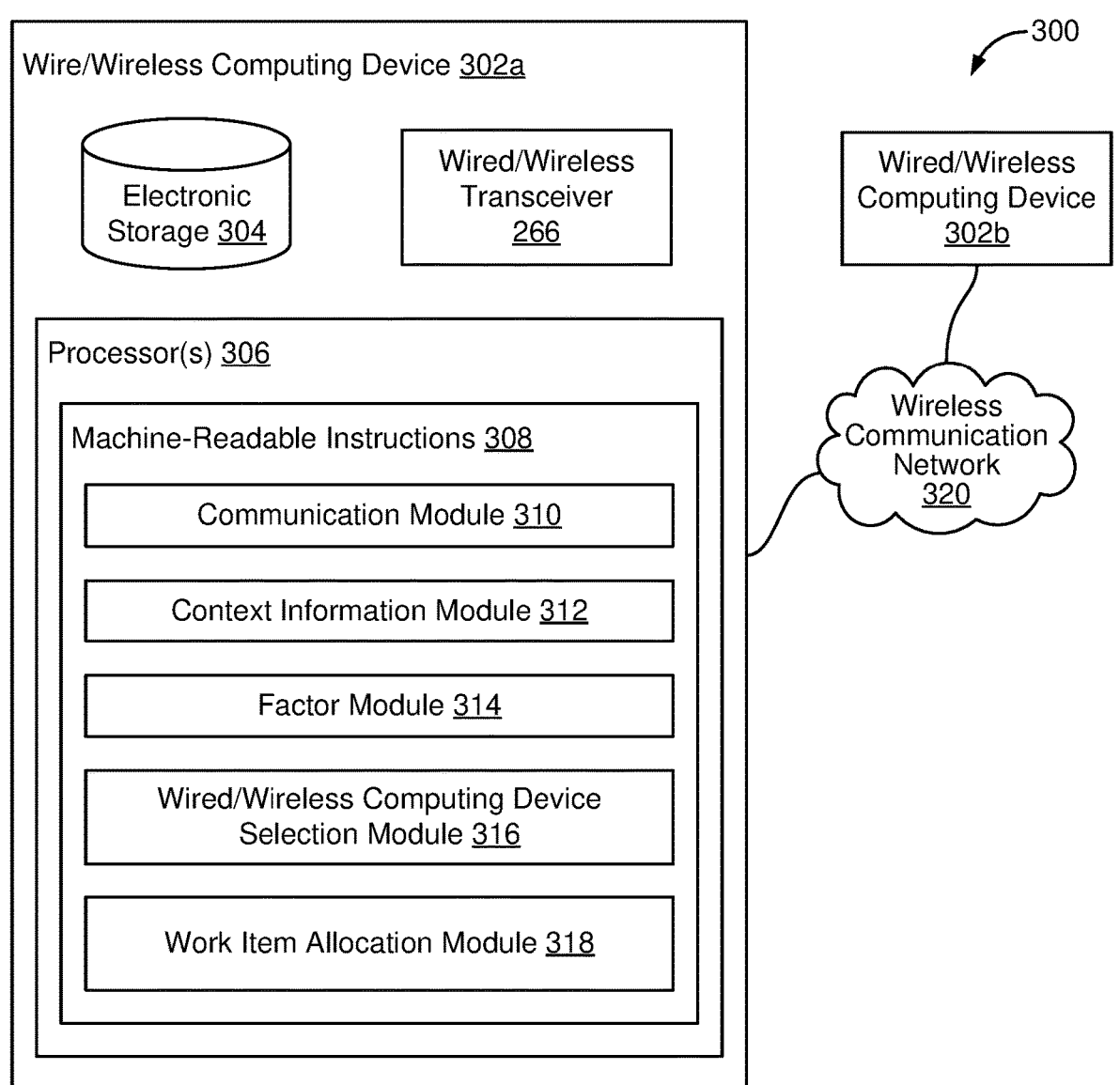
FIG. 3 is a component block diagram illustrating an example of a communication system having wired or wireless computing devices configured to implement distributed compute operation across the wired or wireless computing devices in accordance with various embodiments.

FIG. 3 is a component block diagram illustrating an example of a communication system 300 (e.g., communication system 100 in FIG. 1) having wired and/or wireless computing devices 302a, 302 (e.g., wired and/or wireless computing device 102a-102l in FIG. 1) configured to implement distributed compute operation across the connected wired and/or wireless computing devices 302a, 302b in accordance with various embodiments. With reference to FIGS. 1-3, communication system 300 may include at least two wired and/or wireless computing devices 302a, 302b. The wired and/or wireless computing devices 302a, 302b may communicate over a wired and/or wireless communication network 320 (e.g., ad hoc wired and/or wireless communication connections 104a-104g, WPAN 106 in FIG. 1).

The wired and/or wireless computing devices 302a, 302b may include one or more processors 306 (e.g., 210, 212, 214, 216, 218, 252, 260 in FIG. 2) coupled to electronic storage 304 and a wired and/or wireless transceiver 266. The wired and/or wireless transceiver 266 may be configured to receive messages to be transmitted from the processor(s) 306, and to transmit such messages via an antenna (not shown) between the wired and/or wireless computing devices 302a, 302b via the wired and/or wireless communication network 322. Similarly, the wired and/or wireless transceiver 266 may be configured to receive messages transmitted between the wired and/or wireless computing devices 302a, 302b via the wired and/or wireless communication network 322, and pass the messages (e.g., via a modem (e.g., 252) that demodulates the messages) to the one or more processors 306.

The processor(s) 306 may be configured by machine-readable instructions 308. Machine-readable instructions 308 may include one or more instruction modules 310, 312, 314, 316, 318. The instruction modules 310-318 may include computer program modules. The instruction modules 310-318 may include one or more of a wired and/or wireless communication module 310, a context information module 312, a factor module 314, a wired and/or wireless computing device selection module 316, a work item allocation module 318 or other instruction modules. The wired and/or wireless computing device 302a, 302b implementing the modules 310-318 may be referred to herein as a selection wired and/or wireless computing device.

The context information module 312 may be configured to retrieve, store, and/or update context information of the wired and/or wireless computing devices 302a, 302b. For example, the context information may be retrieved from and/or stored to the electronic storage 304. As another example, the context information may be updated to reflect state changes of the wired and/or wireless computing devices 302a, 302b, including any of various components thereof, such as states of one or more batteries (not shown), processors 306, electronic storages 304, locations, etc.

The factor module 314 may be configured determine factors used in selecting at least one wired and/or wireless computing device 302a, 302b for gathering sensor data and/or implementing the work item in response to the request for execution of the work item. Such factors may include results of various operations to select, calculate, and/or identify information for use in selecting at least one wired and/or wireless computing device 302a, 302b.

For example, the factor module 314 may be configured to select one or more sensors of one or more wired and/or wireless computing devices 302a, 302b for implementing a work item. As another example, the factor module 314 may select the one or more sensors based on one or more sensor types. The factor module 314 may be configured to estimate an accuracy for a combination of sensors based on the accuracy of the sensors of the combination indicated in the context information of the one or more wired and/or wireless computing devices 302a, 302b. Such an estimate of the accuracy for the combination of sensors may be used as and/or in estimating an accuracy of results for the work item. As another example, the factor module 314 may select the one or more sensors based on an accuracy of the one or more sensors indicated in the context information of the one or more wired and/or wireless computing devices 302a, 302b and a sensor accuracy parameter for the work item. The sensors may be any combination of types of sensors. For example, a plurality of a same and/or a different type of sensors may be selected.

As another example, the factor module 314 may be configured to estimate latency for data transmission between at least two wired and/or wireless computing devices 302a, 302b for implementing the work item. At least one of the wired and/or wireless computing devices 302a, 302b may include a selected sensor. Calculating the estimate of latency for data transmission may include using data amount parameters for the work item. The factor module 314 may be configured to estimate energy use for data transmission between the at least two wired and/or wireless computing devices 302a, 302b for implementing the work item. The factor module 314 may be configured to estimate an accumulation of latency and an accumulation of energy use for data transmission between at least two wired and/or wireless computing devices 302a, 302b.

As another example, the factor module 314 may be configured to estimate latency for processing the work item by at least one of the wired and/or wireless computing devices 302a, 302b. Calculating the estimate of latency for data transmission may include using latency parameters for the work item. The factor module 314 may be configured to estimate energy use for processing the work item by at least one of the wired and/or wireless computing devices 302a, 302b. The factor module 314 may be configured to estimate an accumulation of latency and an accumulation of energy use for processing the work item by at least one of the two wired and/or wireless computing devices 302a, 302b.

As another example, the factor module 314 may be configured to identify a state of at least one of the wired and/or wireless computing devices 302a, 302b. For example, the factor module 314 may identify a state of the at least one of the wired and/or wireless computing devices 302a, 302b from the associated context information, such as a state of a processor 306, a state of a memory (e.g., memory 220, 258 in FIG. 2, electronic storage 304), a state of a battery, a state of a connection (e.g., wired and/or wireless communication connections 104a-104g in FIG. 1), a location, etc.

The wired and/or wireless computing device selection module 316 may be configured to select at least one wired and/or wireless computing device 302a, 302b for various assignments. For example, the wired and/or wireless computing device selection module 316 may be configured to select at least one wired and/or wireless computing device 302a, 302b for gathering sensor data (referred to herein as a sensor wired and/or wireless computing device) and/or implementing the work item (referred to herein as an execution wired and/or wireless computing device) in response to the request for execution of the work item. As another example, the wired and/or wireless computing device selection module 316 may be configured to select at least one wired and/or wireless computing device 302a, 302b as the selection wired and/or wireless computing device to select one or more other wired and/or wireless computing devices as the sensor and/or execution wired and/or wireless computing devices.

The wired and/or wireless computing device selection module 316 may select the at least one wired and/or wireless computing device 302a, 302b based on results of the factor module 314. The wired and/or wireless computing device selection module 316 may compare the results of the factor module 314 to one or more criterion. For selecting the selection wired and/or wireless computing device, the wired and/or wireless computing device selection module 316 may compare the results of the factor module 314 to one or more criterion of a selection policy. For selecting the sensor and/or execution wired and/or wireless computing devices, the wired and/or wireless computing device selection module 316 may compare the results of the factor module 314 to one or more criterion of a of a work allocation policy. For example, the wired and/or wireless computing device selection module 316 may select at least one wired and/or wireless computing device 302a, 302b with one or more sensors having at least a threshold accuracy, referred to herein a sensor wired and/or wireless computing device. The wired and/or wireless computing device selection module 316 may select at least one wired and/or wireless computing device 302a, 302b for executing the work item, referred to herein as an execution wired and/or wireless computing device. For example, the wired and/or wireless computing device selection module 316 may select a combination of wired and/or wireless computing devices 302a, 302b as the one or more sensor wired and/or wireless computing devices and execution wired and/or wireless computing devices based on a mathematical, algorithmic, heuristic, etc. algorithm configured to achieve criteria for work items such as accuracy of results, accumulation of latency, and/or accumulation of energy use. Such criteria may be predetermined, configurable, and/or dynamic. In some examples, the criteria may be implemented with reference to each other, such as one or more weighted values, such as ratios and/or proportions, of accuracy of results, accumulation of latency, and/or accumulation of energy use. As another example, the wired and/or wireless computing device selection module 316 may select at least one wired and/or wireless computing device 302a, 302b with at most a threshold data transfer latency with the sensor wired and/or wireless computing device, and with at least a threshold latency for executing the work item and/or at least the threshold battery level following executing the work item as the execution wired and/or wireless computing device.

The work item allocation module 318 may allocate (or assign) work items to the sensor wired and/or wireless computing device and/or the execution wired and/or wireless computing device. For example, the work item allocation module 318 may allocate a work item to gather sensor data and transmit the sensor data to the execution wired and/or wireless computing device by the sensor wired and/or wireless computing device. As another example, the work item allocation module 318 may allocate a work item to execute using the sensor data by the execution wired and/or wireless computing device.

Other modules (not show) may enable the wired and/or wireless computing devices 302a, 302b to gather sensor data and transmit the sensor data to the execution wired and/or wireless computing device, to execute the work item using the sensor data, and to transmit the results of the work item to the wired and/or wireless computing device 302a, 302b requesting execution of the work item.

The wired and/or wireless communication module 310 may be configured to establish ad hock wired and/or wireless communication connections (e.g., wired and/or wireless communication connections 104a-104g in FIG. 1) and transmit and receive context information, requests for execution of work items, work item allocations, sensor data, and work item results between the wired and/or wireless computing device 302a, 302b via the wired and/or wireless communication network 320. In some embodiments, the requests for execution of work items may be accompanied by work item parameters and/or a work allocation policy.

The electronic storage 304 may include non-transitory storage media that electronically stores information. Electronic storage 304 may store software algorithms, information determined by processor(s) 306, information received from the wired and/or wireless computing device 302a, 302b, or other information that enables the wired and/or wireless computing device 302a, 302b to function as described herein.

The electronic storage media of electronic storage 304 may include one or both of system storage that is provided integrally (i.e., substantially non-removable) with the wired and/or wireless computing device 302a, 302b and/or removable storage that is removably connectable to the wired and/or wireless computing device 302a, 302b via, for example, a port (e.g., a universal serial bus (USB) port, a firewire port, etc.) or a drive (e.g., a disk drive, etc.). Electronic storage 304 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 304 may include one or more virtual storage resources (e.g., cloud storage, a virtual private network, and/or other virtual storage resources).

Processor(s) 306 may be configured to provide information processing capabilities in the wired and/or wireless computing device 302a, 302b. As such, the processor(s) 306 may include one or more of a digital processor, an analog processor, a digital circuit designed to process information, an analog circuit designed to process information, a state machine, and/or other mechanisms for electronically processing information. Although the processor(s) 306 are illustrated as single entities, this is for illustrative purposes only. In some embodiments, the processor(s) 306 may include a plurality of processing units and/or processor cores. The processing units may be physically located within the same device, or processor(s) 306 may represent processing functionality of a plurality of devices operating in coordination. The processor(s) 306 may be configured to execute modules 310-318 and/or other modules by software; hardware; firmware; some combination of software, hardware, and/or firmware; and/or other mechanisms for configuring processing capabilities on processor(s) 306.

As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 310-318 described herein is for illustrative purposes, and is not intended to be limiting, as any of modules 310-318 may provide more or less functionality than is described. For example, one or more of the modules 310-318 may be eliminated, and some or all of its functionality may be provided by other modules 310-318. As another example, the processor(s) 306 may be configured to execute one or more additional modules that may perform some or all of the functionality attributed to one of the modules 310-318.

Figure 4:
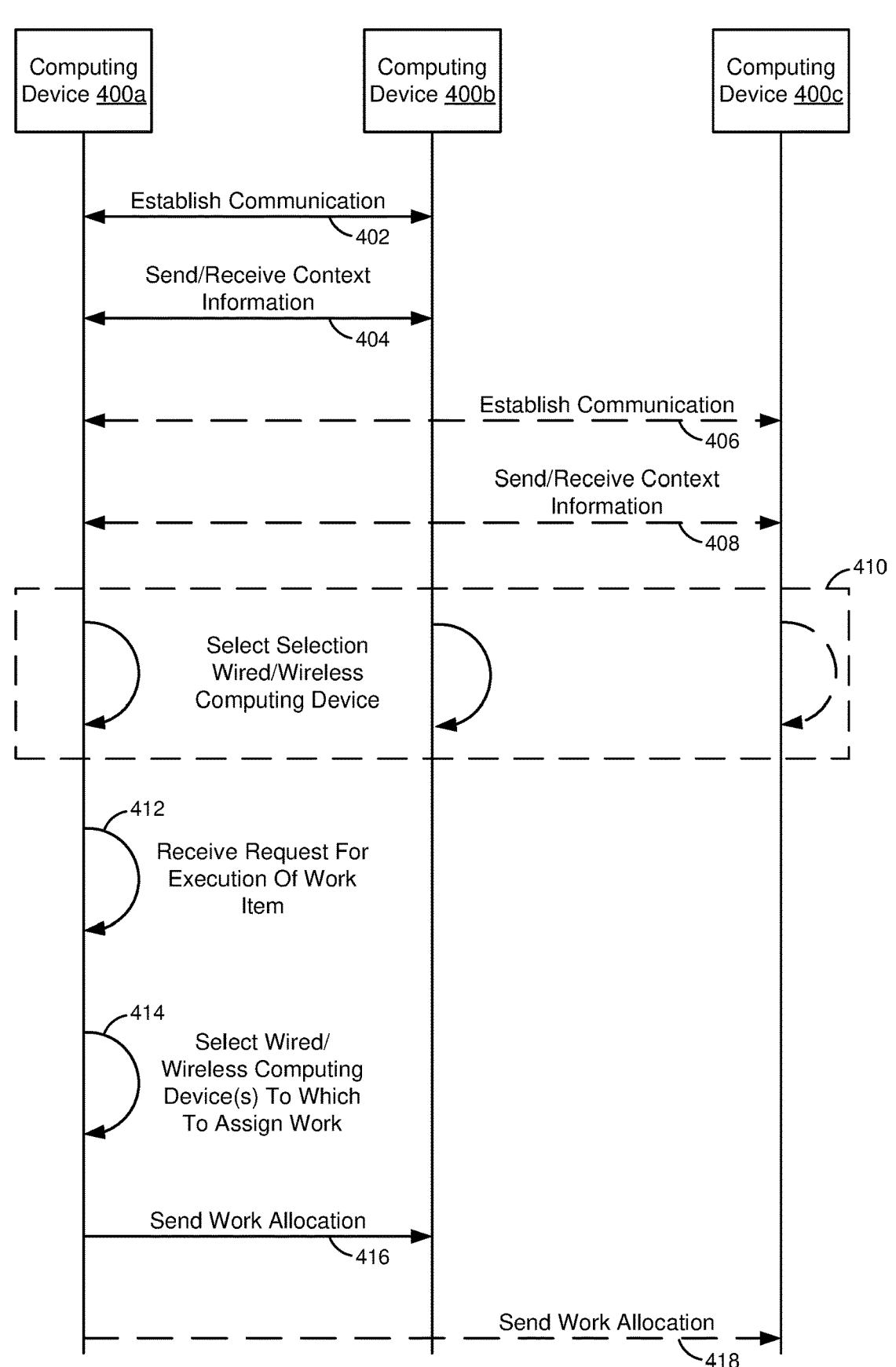
FIG. 4 is a component signaling diagram illustrating an example of a system configured to implement distributed compute operation across connected wired or wireless computing devices in accordance with various embodiments.

FIG. 4 illustrates an example of a communication system (e.g., communication system 100 in FIG. 1, communication system 200 300 in FIG. 3) configured to implement distributed compute operation across connected computing devices 400a, 400b, 400c (e.g., computing devices 102a-102l in FIG. 1, computing devices 302a, 302b in FIG. 3) in accordance with various embodiments. With reference to FIGS. 1-4, in the example illustrated in FIG. 4 the computing devices 400a, 400b, 400c may server different rolls in the communication system. For example, at any moment one of the computing devices 400a, 400b, 400c may be a selection computing device, and the others of the computing devices 400a, 400b, 400c may each be a sensor computing device and/or an execution computing device.

The computing devices 400a, 400b may establish an ad hoc communication connection (e.g., wireless communication connections 104a-104g in FIG. 1) (402). The computing devices 400a, 400b may send and receive context information of the computing devices 400a, 400b to and from each other, respectively (404). In some embodiments, the computing devices 400a, 400c may establish an ad hoc communication connection (e.g., wired and/or wireless communication connections 104a-104g in FIG. 1) (406). The computing devices 400a, 400c may send and receive context information of the computing devices 400a, 400c to and from each other, respectively (408).

The ad hoc communication connection may be enabled using any of various wired technologies (e.g., ethernet) and/or radio frequency, wireless communication technologies (or radio access technologies), such as Wi-Fi (e.g., Wi-Fi direct), Bluetooth, Bluetooth low energy, wireless USB, ZigBee, Ultra-wideband, and the like. In some embodiments, the computing devices 400a, 400b, 400c may send and receive context information of other computing devices 400a, 400b, 400c to which they have an established connection. In this manner, computing devices 400a, 400b, 400c part of a WPAN (e.g., WPAN 106 in FIG. 1) that are not connected via an ad hoc communication connection may receive context information of other computing device 400a, 400b, 400c to which the computing devices 400a, 400b, 400c is not connected by an ad hoc communication connection.

One or more of computing devices 400a, 400b, 400c sending and receiving context information (404, 408) may be repeated one or more times at any time while the ad hoc communication connection remains established (402, 406). For example, one or more of computing devices 400a, 400b, 400c may send and receive context information (404, 408) that is updated to reflect state changes of the computing devices 400a, 400b, 400c, including any of various components thereof, such as states of one or more batteries, processors (e.g., processor 210, 212, 214, 216, 218, 252, 260 in FIG. 2, processor 306 in FIG. 3), memories (e.g., memory 220, 258 in FIG. 2, electronic storage 304 in FIG. 3), locations, etc. As another example, one or more of computing devices 400a, 400b, 400c may send and receive context information (404, 408) for connection with an additional computing device.

The computing devices 400a, 400b may select from among themselves which one may be the selection computing device. In some embodiments, the computing devices 400a, 400b, 400c may select from among themselves which one may be the selection computing device. The selection of the selection computing device may be made based on criteria for selecting a selection computing device based on the context information of the computing devices 400a, 400b, 400c. For ease of explanation and clarity, for the remainder of the description of the example illustrated in FIG. 4, the computing device 400a will be referred to as the selection computing device 400a. However, this example does not exclude the possibility that either of the computing devices 400b, 400c may alternatively be the selection computing device. Selecting from among the computing devices 400b, 400c which one may be the selection computing device (410) may be implemented multiple times based on updates to and/or new context information received by the computing devices 400a, 400b, 400c.

The selection computing device 400a may receive a request for execution of a work item (412). In the example illustrated in FIG. 4, the request for execution of a work item originates from the selection computing device 400a. In other examples, the request for execution of a work item may originate from and be sent by another computing device (e.g., wired and/or wireless computing devices 102a-102l in FIG. 1, wired and/or wireless computing devices 302a, 302b in FIG. 3), including either of the computing devices 400b, 400c. In some embodiments, the requests for execution of work items may be accompanied by work item parameters and/or a work allocation policy.

In operation 414, the selection computing device 400a may select one or more computing devices 400b, 400c to which to assign work. The selection computing device 400a may make the selection of at least one sensor computing device and at least one execution computing device. In some embodiments, the sensor computing device and the execution computing device may be the same computing devices 400a. In some embodiments, the sensor computing device may be at least one of the computing devices 400b, 400c and the execution computing device may be may be at least one of the computing devices 400b, 400c. For example, one of the computing devices 400b, 400c may be the sensor computing device and the other of the computing devices 400b, 400c may be the execution computing device. As another example, one of the computing devices 400b, 400c may also be a sensor computing device or and execution computing device.

The operation 414 of selecting one or more computing devices 400b, 400c to which to assign work may be implemented multiple times for one or more work items of a set of work items. The operation 414 of selecting one or more computing devices 400b, 400c to which to assign work may be implemented multiple times for one or more work items based on updates to context information received by the selection computing device 400a.

The selection computing device 400a may send a work allocation in message 416 to the computing devices 400b. In some embodiments, the work allocation may be for gathering sensor data and/or executing the work item using gathered sensor data. In some embodiments, the selection computing device 400a may send a work allocation to the computing devices 400c in messages 418. For example, the work allocation sent to one of the computing devices 400b, 400c may be for gathering sensor data and sending the sensor data to the other of the computing devices 400b, 400c, and the other of the computing devices 400b, 400c executing the work item using gathered sensor data. As another example, the work allocation sent to each of the computing devices 400b, 400c may include any combination of gathering sensor data, sending the sensor data to the other of the computing devices 400b, 400c, and/or executing the work item using gathered sensor data.

FIG. 5 illustrates an example of a context information 500 for a computing device (e.g., wired and/or wireless computing device 102a-102l in FIG. 1, wired and/or wireless computing device 302a, 302b in FIG. 3, computing device 400a-400c in FIG. 4) configured to implement distributed compute operation across connected computing devices in accordance with various embodiments.

With reference to FIGS. 1-5, the context information 500 for a computing device may include any combination of information, such as, processor(s) information 502, sensor(s) information 504, connections(s) information 506, battery information 508, location information 510, memory information 512, measured work performance information 514, etc. The context information 500 may be stored on a computing device, such as in a memory (e.g., memory 220, 258 in FIG. 2, electronic storage 304 in FIG. 3), and, when communicatively connected to another computing device, transmitted to the other computing device.

The context information 500 may be updated by the computing device to reflect state changes of the computing device, including any of various components thereof, such as states of one or more batteries, processors (e.g., processor 210, 212, 214, 216, 218, 252, 260 in FIG. 2, processor 306 in FIG. 3), memories (e.g., memory 220, 258 in FIG. 2, electronic storage 304 in FIG. 3), locations, etc. The examples of the context information 500 described herein are both non-limiting and non-exhaustive. The context information 500 may include any part of, including all, of the context information 500 described herein, and any other information of the computing device to which the context information 500 relate that may be used to implement distributed compute operation across connected computing devices.

The processor(s) information 502 may include information relating to one or more processors of the computing device. For example, the processor(s) information 502 may include a processor type, a processing power, a processing energy usage, a processing workload, etc. for each processor of the computing device.

The sensor(s) information 504 may include information relating to one or more sensors of the computing device. For example, the sensor(s) information 504 may include a sensor type (e.g., microphone, accelerometer, gyroscope, light sensor, infrared sensor, capacitive sensor, biometric sensor, biomedical sensor, motion sensor, thermometer, thermistor, barometer, humidistat, pressure sensor, etc.), a sensor accuracy, etc. for each sensor of the computing device.

The connections(s) information 506 may include information relating to one or more communication connections (e.g., wired and/or wireless communication connections 104a-104g in FIG. 1) of the computing device to another the computing device. For example, the connections(s) information 506 may include a data transfer speed between the computing devices, a data transfer energy usage between the computing devices, etc. for past, current, and/or potential communication connections of the computing device to another the computing device. The connections(s) information 506 may further include wired and/or wireless communication technology capabilities (e.g., Wi-Fi (e.g., Wi-Fi direct), Bluetooth, Bluetooth low energy, wired or wireless USB, ZigBee, Ultra-wideband, and the like) and the data transfer speed and/or the data transfer energy usage may be in association with specific communication technologies.

The battery information 508 may include information relating to one or more batteries of the computing device. For example, the battery information 508 may include a battery charge level, a battery charging status, etc. for each battery and/or cumulatively for all batteries of the computing device. In some embodiments, battery information 508 may be included for computing devices having at least one battery and excluded for computing devices without a battery.

The location information 510 may include information relating to a location of the computing device. The location information 510 may include orientation, a relative location (e.g., distance relative to another computing device, distance relative to a user, location relative to a user, such as in a pocket, on a wrist, in an ear, etc., distance relative to location, location relative to an object, such as on a surface, in a vehicle, connected to a charger, etc., orientation relative to the object, etc.), etc. for the computing device. For example, the location information 510 may be relative location information (e.g., as separation distance) as my be measured based on received signal strength, round-trip-timing methods, and the like. As another example, the location information 510 may include location information obtained by a receiver of a satellite and/or radio positioning system (e.g., Global Positioning System (GPS), GLONASS, Galileo, Beidou, etc.).

The memory information 512 may include information relating to a memory of the computing device. For example, the memory information 512 may include a memory availability (e.g., allocated memory space, amount of available memory space, etc.), memory latency, memory energy usage, etc. for each memory of the computing device.

The measured work performance information 514 may include information relating to prior executions of a work item by the computing device. For example, the measured work performance information 514 may include a work item identifier (e.g., an identifier of the work item, a type of work item, an identifier of a set of work items to which the work item belongs, etc.), a work item latency measured from the prior execution (e.g., a measurement of data transfer and/or processing latency for each prior execution, a statistical representation of measurements of data transfer and/or processing latency of multiple prior executions, etc.), a work item energy consumption measured from the prior execution (e.g., a measurement of data transfer and/or processing energy consumption for each prior execution, a statistical representation of measurements of data transfer and/or processing energy consumption of multiple prior executions, etc.), a work item result accuracy (e.g., a measurement of accuracy of results for each prior execution, a statistical representation of measurements of accuracy of results of multiple prior executions, etc.), etc. for individual and/or cumulative prior executions of work items by the computing device. As another example, the measured work performance information 514 may Include an indication of one or more other computing devices (e.g., a computing device identifier) involved in executing the work item in association with the other measured work performance information 514 for the one or more other computing devices.

FIG. 6 illustrates an example of a set of work item parameters 600 for executing a work item by a computing device (e.g., wired and/or wireless computing device 102a-102l in FIG. 1, wired and/or wireless computing device 302a, 302b in FIG. 3, computing device 400a-400c in FIG. 4) configured to implement distributed compute operation across connected computing devices in accordance with various embodiments.

With reference to FIGS. 1-6, the work item parameters 600 for executing a work item may include any combination of information, such as, latency parameter(s) 602, data amount parameter(s) 604, sensor accuracy parameter(s) 606, etc. The work item parameters 600 may be stored on a computing device, such as in a memory (e.g., memory 220, 258 in FIG. 2, electronic storage 304 in FIG. 3) and retrieved from the memory in response to receiving a request for execution of a corresponding work item. The work item parameters 600 may be received from another computing device in conjunction with a request for execution of a corresponding work item. The examples of the work item parameters 600 described herein are both non-limiting and non-exhaustive. The work item parameters 600 may include any part of, including all, of the work item parameters 600 described herein, and any other information for executing the work item to which the work item parameters 600 relate.

The latency parameter(s) 602 may include one or more parameters relating to latency for executing the work item to which the work item parameters 600 relate. For example, the latency parameter(s) 602 may include one or more latency measurements and/or estimates for processing the work item by on one or more processors (e.g., processor 210, 212, 214, 216, 218, 252, 260 in FIG. 2, processor 306 in FIG. 3). The latency parameter(s) 602 may include the one or more latency measurements and/or estimates in association with information relating to the one or more processors, such as processor type, processor power, number of processors, etc.

The data amount parameter(s) 604 may include one or more parameters relating to amounts of data for executing the work item to which the work item parameters 600 relate. For example, the data amount parameter(s) 604 may include one or more amounts of data to be gathered by one or more sensors for executing the work item. The data amount parameter(s) 604 may include one or more amounts of data in association with information relating to the one or more sensors, such as sensor type, sensor sensitivity, number of sensors, etc.

The sensor accuracy parameter(s) 606 may include one or more parameters relating to sensor accuracy levels for executing the work item to which the work item parameters 600 relate. For example, the sensor accuracy parameter(s) 606 may include one or more sensor accuracy levels for one or more sensors for executing the work item. The sensor accuracy parameter(s) 606 may include one or more sensor accuracy levels in association with information relating to the one or more sensors, such as sensor type, sensor sensitivity, number of sensors, etc. The sensor accuracy parameter(s) 606 may include one or more sensor accuracy levels for a combination of sensors of one or more types of sensors.

Other work item parameters 600 may include parameters specifying one or more states of a computing device for executing the work item to which the work item parameters 600 relate. For example, such states may include a specific state for executing the work item and/or a hierarchy of a state ordering preferences of the state for executing the work item. Such states may include a state of a processor (e.g., processor 210, 212, 214, 216, 218, 252, 260 in FIG. 2, processor 306), a state of a memory (e.g., memory 220, 258 in FIG. 2, electronic storage 304 in FIG. 3), a state of a battery, a state of a connection (e.g., wired and/or wireless communication connections 104a-104g in FIG. 1), a location, etc.

FIG. 7 illustrates an example of a work allocation policy 700 for executing work by a computing device (e.g., wired and/or wireless computing device 102a-102l in FIG. 1, wired and/or wireless computing device 302a, 302b in FIG. 3, computing device 400a-400c in FIG. 4) configured to implement distributed compute operation across connected computing devices in accordance with various embodiments. With reference to FIGS. 1-7, the work allocation policy 700 for executing a work item may include any combination of information, such as, latency parameter(s) 702, power parameter(s) 704, result accuracy parameter(s) 705, policy criteria 706, etc. The work allocation policy 700 may be stored on a computing device, such as in a memory (e.g., memory 220, 258 in FIG. 2, electronic storage 304 in FIG. 3) and retrieved from the memory in response to receiving a request for execution of a work item. The work allocation policy 700 may be received from another computing device in conjunction with a request for execution of a work item. The work allocation policy 700 may be work item agnostic and/or work item specific. The examples of the work allocation policy 700 described herein are both non-limiting and non-exhaustive. The work allocation policy 700 may include any part of, including all, of the work allocation policy 700 described herein, and any other information for executing the work item.

The latency parameter(s) 702 may include one or more parameters relating to latency for executing the work item. For example, the latency parameter(s) 702 may include one or more latency thresholds and/or targets for processing the work item, such as a maximum latency for processing the work item.

The power parameter(s) 704 may include one or more parameters relating to remaining power following executing the work item. For example, the power parameter(s) 704 may include one or more remaining power thresholds and/or targets following processing the work item, by one or more battery powered computing devices. The power parameter(s) 704 may include one or more remaining power thresholds and/or targets in association with information relating to the one or more one or more battery powered computing devices, such as a type of computing device, a battery type, a battery capacity, a number of batteries, etc. The one or more remaining power thresholds and/or targets may be a minimum amount of remaining power for one or more battery powered computing devices and/or batteries following processing the work item.

The result accuracy parameter(s) 705 may include one or more parameters relating to accuracy of one or more results from executing the work item. For example, the result accuracy parameter(s) 705 may include one or more result accuracy thresholds and/or targets for one or more results from the processed work item, such as a minimum result accuracy from the processed work item.

The policy criteria 706 may include one or more rules for executing the work item. For example, the policy criteria 706 may include one or more rules based on other information of the work allocation policy 700, such as the latency parameter(s) 702 and/or the power parameter(s) 704. The policy criteria 706 may include one or more other rules for executing the work item. For example, the policy criteria 706 may include one or more rules for selecting one or more computing devices for executing the work item based on an estimate of latency for executing the work item by the one or more computing devices being at most one or more latency thresholds and/or targets of the latency parameter(s) 702. As another example, the policy criteria 706 may include one or more rules for selecting one or more computing devices for executing the work item based on an estimate of a battery level following executing the work item by the one or more computing devices being at least one or more remaining power thresholds and/or targets of the power parameter(s) 704. For another, example, the policy criteria 706 may include one or more rules for selecting one or more computing devices for executing the work item based on decreasing, such as minimizing, the estimate of latency for executing the work item by the one or more computing devices. For another, example, the policy criteria 706 may include one or more rules for selecting one or more computing devices for executing the work item based on reducing energy consumption, such as maximizing the estimate of battery level following executing the work item by the one or more computing devices. For another, example, the policy criteria 706 may include one or more rules for selecting one or more computing devices for executing the work item based on increasing, such as maximizing, an accuracy of one or more sensors of one or more computing devices for gathering sensor data for executing the work item.

FIG. 8 illustrates an example of a method for distributing compute operation across connected computing devices in accordance with various embodiments. With reference to FIGS. 1-8, the method 800 may be implemented in a computing device (e.g., wired and/or wireless computing device 102a-102l in FIG. 1, wired and/or wireless computing device 302a, 302b in FIG. 3, computing device 400a-400c in FIG. 4), in general purpose hardware, in dedicated hardware, in software executing in a processor (e.g., processor 210, 212, 214, 216, 218, 252, 260 in FIG. 2, processor 306, module 310-318 in FIG. 3), or in a combination of a software-configured processor and dedicated hardware, such as a processor executing software within a communication system (e.g., communication system 100 in FIG. 1, communication system 300 in FIG. 3) that includes other individual components, and various memory/cache controllers (e.g., memory 220, 258 in FIG. 2, electronic storage 304 in FIG. 3). In order to encompass the alternative configurations enabled in various embodiments, the hardware implementing the method 800 is referred to herein as a "processing device".

In block 802, the processing device may establish a communication connection (e.g., wired and/or wireless communication connections 104a-104g in FIG. 1) between a communication device (e.g., wired and/or wireless communicating device 102a-102l in FIG. 1, wired and/or wireless computing device 302a, 302b in FIG. 3, computing device 400a-400c in FIG. 4) with the processing device and another communication device. Each communication connection may be an ad hoc communication connection established using compatible communication technologies, such as Wi-Fi (e.g., Wi-Fi direct), Bluetooth, Bluetooth low energy, wired or wireless USB, ZigBee, Ultra-wideband, and the like. Wired and/or wireless communication connections may be established between any combination of communication devices. Wired and/or wireless communication connections between two or more communication devices may be for network, such as a WPAN (e.g., WPAN 106 in FIG. 1). The processing device establish the wired and/or wireless communication connection between the communication device with the processing device and the other communication device in block 802 may be a processor (e.g., processor 210, 212, 214, 216, 218, 252, 260 in FIG. 2, processor 306, module 310-318 in FIG. 3) and/or a communication module (e.g., wired and/or wireless communication module 310 in FIG. 3).

In block 804, the processing device may send and receive context information (e.g., context information 500 in FIG. 5) of computing devices to and from other computing devices. In some embodiments, the processing device may send and receive context information of other computing devices to which the processing device has an established connection. In this manner, the other computing devices that are part of a WPAN (e.g., WPAN 106 in FIG. 1) that are not connected via an ad hoc communication connection to one or more computing devices of the network (e.g., WPAN) to which the processing device is connected may receive context information of the one or more computing device to which the other computing devices are not connected by an ad hoc communication connection. Sending and receiving context information may be repeated one or more times at any time while the ad hoc communication connection remains established. For example, the processing device may send and receive context information that is updated to reflect state changes of the computing device, including any of various components thereof, such as states of one or more batteries, processors, memories, locations, etc. As another example, the processing device may send and receive context information for connection with an additional computing device. In some embodiments, the processing device sending and receiving the context information of the computing devices to and from the other computing devices in block 804 may be the processor, the communication module, and/or a context information module (e.g., context information module 312 in FIG. 3).

In block 806, the processing device may select a selection computing device. In block 806, the processing device functioning as the selection computing device may determine factors based on the context information of the associated computing device and the other computing devices of the WPAN and compare the results with one or more criterion of a selection policy to select the selection computing device from among the computing devices of the WPAN. In various embodiments, the processing device or components selecting the selection computing device in block 806 may be the processor, the context information module, a factor module (e.g., factor module 314 in FIG. 3), and/or a computing device selection module (e.g., wired and/or wireless computing device selection module 316 in FIG. 3). For ease of explanation and clarity, for the remainder of the description of the methods 800, 900a, 900b, 1000a, 1000b, 1100a, 1100b, 1200a, 1200b, 1300a, 1300b illustrated in FIGS. 8-13B, the computing device associated with the processing device will be referred to as the "selection computing device."

It should be appreciated that the descriptions of the various embodiments are not intended to limit the claims or exclude the possibility that any of the other computing devices may be selected as the selection computing device initially or at any time thereafter. The processing device may select the selection computing device from among the computing devices of the WPAN multiple times, with the selection computing device function moving from one computing device to another periodically or episodically, such as based on or in response to updates to and/or new context information received by the processing device, as well as other computing device connecting to the WPAN.

In block 808, the processing device may receive a work item request. The work item request may be a request for execution of a task that may trigger the processing device of the selection computing device to select one or more computing devices of the WPAN as a sensor computing device for gathering sensor data for execution of the work item and an execution computing device for execution of the work item. In some embodiments, the processing device receiving the work item request in block 808 may be the processor and/or the communication module.

In block 810, the processing device may determine factors for selecting the one or more computing devices as a sensor computing device and an execution computing device. Such factors may include results of various operations to select, calculate, and/or identify information for use in selecting at least one computing device. Such operations may use information, such as the context information of the computing devices and/or work item parameters (e.g., work item parameters 500 in FIG. 5) of the work item, as input information. For example, the factors may include one or more of a sensor accuracy, a data transfer latency and/or energy usage for data transfer between a sensor computing device and an execution computing device, a processing latency and/or energy usage by an execution computing device, one or more states of a sensor computing device and an execution computing device, such as a state of a processor (e.g., processor 210, 212, 214, 216, 218, 252, 260 in FIG. 2, processor 306, module 310-318 in FIG. 3), a state of a memory (e.g., memory 220, 258 in FIG. 2, electronic storage 304 in FIG. 3), a state of a battery, a state of a connection (e.g., wired and/or wireless communication connections 104a-104g in FIG. 1), a location, etc. Examples of the processing device determining the factors for selecting the one or more computing devices as a sensor computing device and an execution computing device are described further herein for the methods 900a, 900b, 1000a, 1000b, 1100a, 1100b, 1200a, 1200b with reference to FIGS. 9A-12B. In some embodiments, the processing device determining the factors for selecting the one or more computing devices as a sensor computing device and an execution computing device in block 810 may be the processor, the context information module, and/or the factor module.

In block 812, the processing device may select one or more computing devices as one or more sensor computing devices. The processing device may also select one or more sensors of the one or more sensor computing devices for use in gathering sensor data for executing the work item. Selection of the one or more computing devices and/or sensors may be based on the results of the factors determined in block 810 compared to one or more criterion for selecting the one or more computing devices and/or sensors.

For example, the work item parameters (e.g., work item parameters 600 in FIG. 600) may specify parameters for sensors for executing the work item, such as type of sensors, accuracy of sensors, number of sensors, location of sensors, which may be based on a location of the computing device of which the sensors are a part of, amount of data collected by the sensors, etc. As another example, a work item allocation policy (e.g., work item allocation policy 700 in FIG. 700) may specify one or more criterion for sensors, alone or in combination with execution computing devices, for executing the work item, such as data transfer latency between a sensor computing device and an execution computing device, a remaining battery level of the sensor computing device following execution of the work item, an accuracy of a result from execution of the work item, etc.

As part of the operations in block 812, the processing device may be configured to determine from the results of the determined factors which one or more computing devices and/or sensors to select. In some embodiments, the processing device may select computing devices and/or sensors based on the results of the determined factors for individual ones of the computing devices and/or sensors. In some embodiments, the processing device may determine to select computing devices and/or sensors based on the results of the determined factors for groups of the computing devices and/or sensors. For example, the processing device may be configured to mathematically, algorithmically, and/or heuristically determine a representation of the results of the determined factors for groups of the computing devices and/or sensors for comparing to the one or more criterion for selecting the one or more computing devices and/or sensors. An example of the processing device selecting the one or more computing devices as the one or more sensor computing devices is described further herein for the methods 900a, 900b with reference to FIGS. 9A and 9B. In some embodiments, the processing device selecting the one or more computing devices as the one or more sensor computing devices in block 812 may be the processor and/or the computing device selection module.

In block 814, the processing device may select one or more computing devices as one or more execution computing devices. Selection of the one or more computing devices may be based on the results of the factors determined in block 810 compared to one or more criterion for selecting the one or more computing devices. For example, the work item parameters may specify parameters and/or the work item allocation policy may specify criteria for computing devices for executing the work item, alone and/or in combination with a sensor computing device, such as data transfer latency between a sensor computing device and an execution computing device, a latency for processing the work item, a remaining battery level of the execution computing device following execution of the work item, etc. The processing device may be configured to determine from the results of the determined factors which one or more computing devices to select. In some embodiments, the processing device may determine to select computing devices based on the results of the determined factors for individual ones of the computing devices. In some embodiments, the processing device may determine to select computing devices based on the results of the determined factors for groups of the computing devices. For example, the processing device may be configured to mathematically, algorithmically, and/or heuristically determine a representation of the results of the determined factors for groups of the computing devices for comparing to the one or more criterion for selecting the one or more computing devices. An example of the processing device selecting the one or more computing devices as the one or more execution computing devices is described further herein for the methods 1300*a*, 1300*b* with reference to FIGS. 13A and 13B. In some embodiments, the processing device selecting the one or more computing devices as the one or more execution computing devices in block 814 may be the processor and/or the computing device selection module.

In block 816, the processing device may assign the work item to the one or more selected computing devices. The processing device may assign a data gathering part of the work item to the one or more selection computing devices selected in block 812. The processing device may assign an execution part of the work item to the one or more execution computing devices selected in block 814. The processing device may send signals indicating instructions to the one or more selection and execution computing devices the portions of the work item assigned to the respective computing devices. The signals may be configured to trigger the one or more selection and execution computing devices to implement the portions of the work item assigned to the respective computing devices. Such signals may include indications of which other computing devices are assigned which portions of the work item so that the computing devices may be informed as to making ad hoc communication connections with appropriate ones of the communications to share data. For example, a sensor computing device and an execution computing device may be informed to establish an ad hoc communication connection to transmit sensor data from the sensor computing device and to the execution computing device. The processing device assigning the work item to the one or more selected computing devices in block 816 may be the processor, a work item allocation module (e.g., work item allocation module 318 in FIG. 3), and/or the communication module.

Figure 9A:
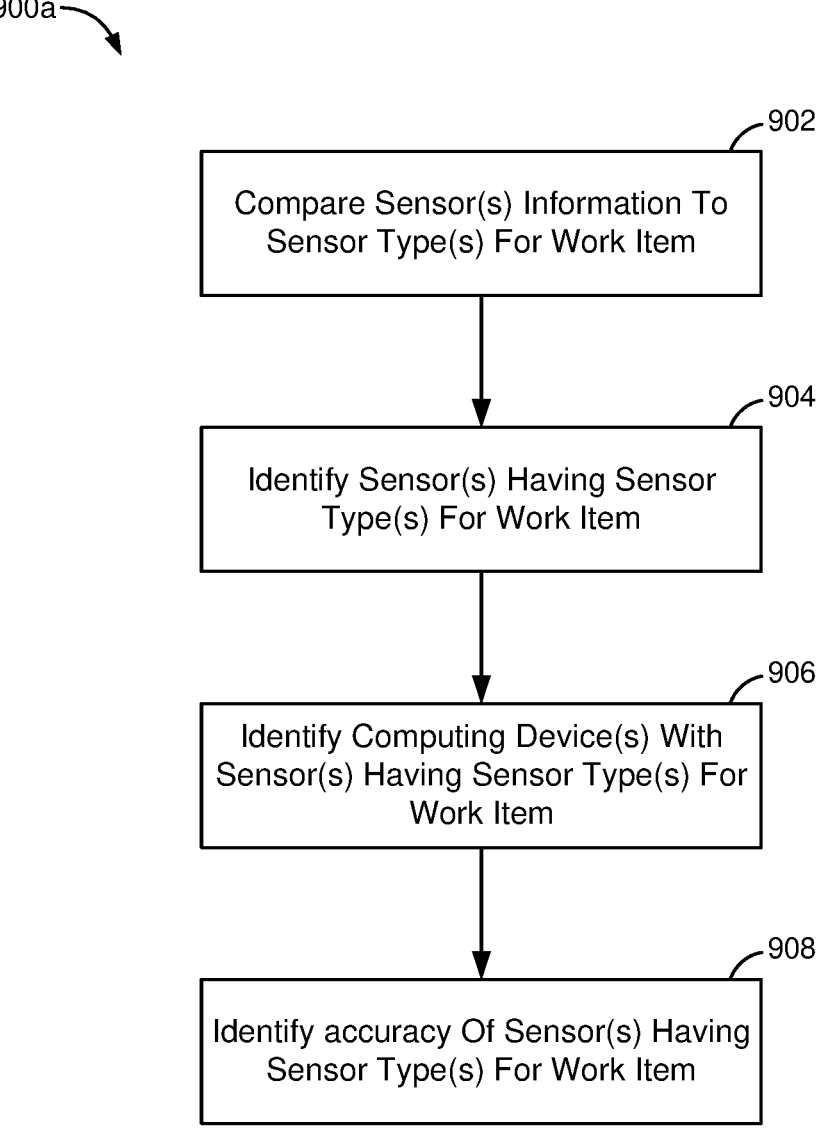
FIGS. 9A and 9B are process flow diagrams illustrating examples of methods for selecting sensors of different wired or wireless computing devices for distributing compute operation across connected wired or wireless computing devices in accordance with various embodiments.
Figure 9B:
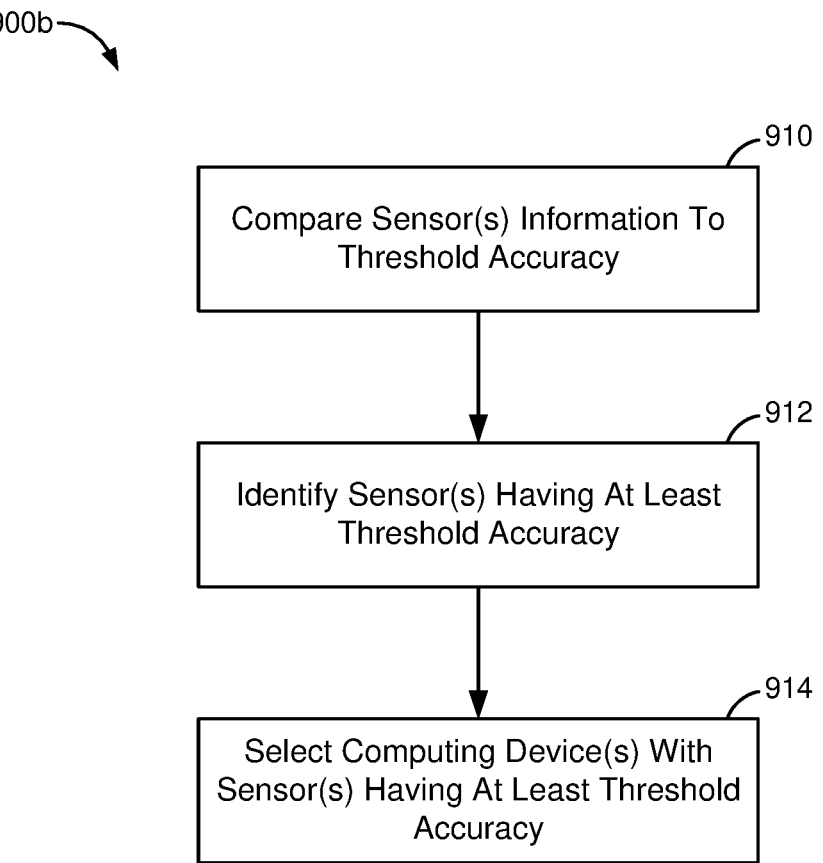

FIGS. 9A and 9B illustrate examples of methods for selecting sensors of WPAN-connected computing devices for distributing compute operation across WPAN-connected computing devices in accordance with various embodiments. With reference to FIGS. 1-9B, the methods 900*a*, 900*b* may be implemented in a computing device (e.g., wired and/or wireless computing device 102*a*-102*l* in FIG. 1, wired and/or wireless computing device 302*a*, 302*b* in FIG. 3, computing device 400*a*-400*c* in FIG. 4), in general purpose hardware, in dedicated hardware, in software executing in a processor (e.g., processor 210, 212, 214, 216, 218, 252, 260 in FIG. 2, processor 306, module 310-318 in FIG. 3), or in a combination of a software-configured processor and dedicated hardware, such as a processor executing software within a communication system (e.g., communication system 100 in FIG. 1, communication system 300 in FIG. 3) that includes other individual components, and various memory/cache controllers (e.g., memory 220, 258 in FIG. 2, electronic storage 304 in FIG. 3). In order to encompass the alternative configurations enabled in various embodiments, the hardware implementing the methods 900*a*, 900*b* is referred to herein as a "processing device." The methods 900*a*, 900*b* may further describe aspects of determining the factors for selecting the one or more computing devices as a sensor computing device and an execution computing device in block 810 and/or selecting the one or more computing devices as the one or more sensor computing devices in block 812 of the method 800 described herein with reference to FIG. 8.

Referring to FIG. 9A, in block 902, the processing device may compare context information (e.g., context information 500 in FIG. 5) relating to sensors of one or more computing devices (e.g., wired and/or wireless computing device 102*a*-102*l* in FIG. 1, wired and/or wireless computing device 302*a*, 302*b* in FIG. 3, computing device 400*a*-400*c* in FIG. 4) to one or more sensor types for a work item. The processing device may retrieve sensor type information from the context information and compare the sensor type information the one or more sensor types for the work item. For example, the processing device may compare sensor type information for individual sensors to the one or more sensor types for the work item. The one or more sensor types for the work item may be, for example, a work item parameter (e.g., work item parameters 600 in FIG. 6) for executing the work item of a request to execute a work item received in block 808 of the method 800 as described. In some embodiments, the processing device comparing the context information relating to the sensors of the one or more computing devices to the one or more sensor types for the work item in block 902 may be a processor (e.g., processor 210, 212, 214, 216, 218, 252, 260 in FIG. 2, processor 306, module 310-318 in FIG. 3), a context information module (e.g., context information module 312 in FIG. 3), a factor module (e.g., factor module 314 in FIG. 3), and/or a computing device selection module (e.g., wired and/or wireless computing device selection module 316 in FIG. 3).

In block 904, the processing device may identify one or more sensors of the one or more computing devices having the one or more sensor types for the work item. Based on the comparisons of sensor type information to the one or more sensor types for the work item in block 902, the processing device may identify which individual and/or groups of sensors have the one or more sensor types for the work item. In some embodiments, the processing device identifying the one or more sensors of the one or more computing devices having the one or more sensor types for the work item in block 904 may be the processor, the context information module, the factor module, and/or the computing device selection module.

In block 906, the processing device may identify one or more computing devices with one or more sensors having the one or more sensor types for the work item. The processing device may use the context information to identify which computing devices include which sensors. In some embodiments, the one or more computing devices may be grouped by features, such as having a type of sensor, and the one or more computing devices with one or more sensors may be identified for each group. In some embodiments, the processing device identifying the one or more computing devices with one or more sensors having the one or more sensor types for the work item in block 906 may be the processor, the context information module, the factor module, and/or the computing device selection module.

In block 908, the processing device may identify an accuracy for the one or more sensors of the one or more computing devices having the one or more sensor types for the work item. The processing device may retrieve sensor accuracy information from the context information and use the retrieved accuracy information to identify the accuracy for the one or more sensors. For example, the processing device may use the retrieved accuracy information to identify sensor accuracy information for individual sensors. As another example, the processing device may use the retrieved accuracy information to generate a representation of sensor accuracy for groups of sensors. The groups of sensors may include sensors of a same and/or different types of sensors. The groups of sensors may include sensors of a same and/or different computing devices, such as the computing devices identified in block 906. In some embodiments, the processing device identifying the accuracy for the one or more sensors of the one or more computing devices having the one or more sensor types for the work item in block 908 may be the processor, the context information module, the factor module, and/or the computing device selection module.

Referring to FIG. 9B, in block 910, the processing device may compare context information (e.g., context information 500 in FIG. 5) relating to sensors of one or more computing devices (e.g., wired and/or wireless computing device 102a-102l in FIG. 1, wired and/or wireless computing device 302a, 302b in FIG. 3, computing device 400a-400c in FIG. 4) to a threshold accuracy. The processing device may retrieve sensor accuracy information from the context information and compare the sensor accuracy information to the threshold accuracy. For example, the processing device may compare sensor accuracy information for individual sensors of the one or more computing devices to the threshold accuracy. As another example, the processing device may compare a representation of sensor accuracy information for groups of sensors of the one or more computing devices to the threshold accuracy. The groups of sensors may include sensors of a same and/or a different type of sensor. The threshold accuracy may be, for example, a work item parameter (e.g., work item parameters 600 in FIG. 6) for executing a work item of a request to execute a work item received in block 808 of the method 800 described herein with reference to FIG. 8. The threshold accuracy may be, for example, a dynamic value updated to an accuracy of a compared accuracy information exceeding the threshold accuracy. In such a manner, comparison of the accuracy information and the accuracy threshold may to identify a greatest accuracy information. The threshold accuracy may be, for example, a relative value, such as a maximum value among the compared accuracy information. In some embodiments, the processing device comparing the context information relating to the sensors of the one or more computing devices to the threshold accuracy in block 910 may be a processor (e.g., processor 210, 212, 214, 216, 218, 252, 260 in FIG. 2, processor 306, module 310-318 in FIG. 3), a context information module (e.g., context information module 312 in FIG. 3), a factor module (e.g., factor module 314 in FIG. 3), and/or a computing device selection module (e.g., wired and/or wireless computing device selection module 316 in FIG. 3).

In block 912, the processing device may identify one or more sensors of the one or more computing devices having at least the threshold accuracy. Based on the comparisons of sensor accuracy information to the threshold accuracy in block 910, the processing device may identify which individual and/or groups of sensors have at least the threshold accuracy. In some embodiments, the processing device identifying the one or more sensors of the one or more computing devices having at least the threshold accuracy in block 912 may be the processor, the factor module, and/or the computing device selection module.

In block 914, the processing device may select one or more computing devices and sensors having at least the threshold accuracy. For example, the processing device may select one or more individual and/or groups of computing devices having the individual and/or groups of sensors having at least the threshold accuracy as a limiting means to the range of communication devices that may be considered for selection as sensor computing devices and/or execution computing device. As another example, the processing device may select one or more individual and/or groups of computing devices having the individual and/or groups of sensors having at least the threshold accuracy as one or more selection computing devices. In some embodiments, the processing device selecting the one or more computing devices and sensors having at least the threshold accuracy in block 914 may be the processor, the factor module, and/or the computing device selection module.

Figure 10A:
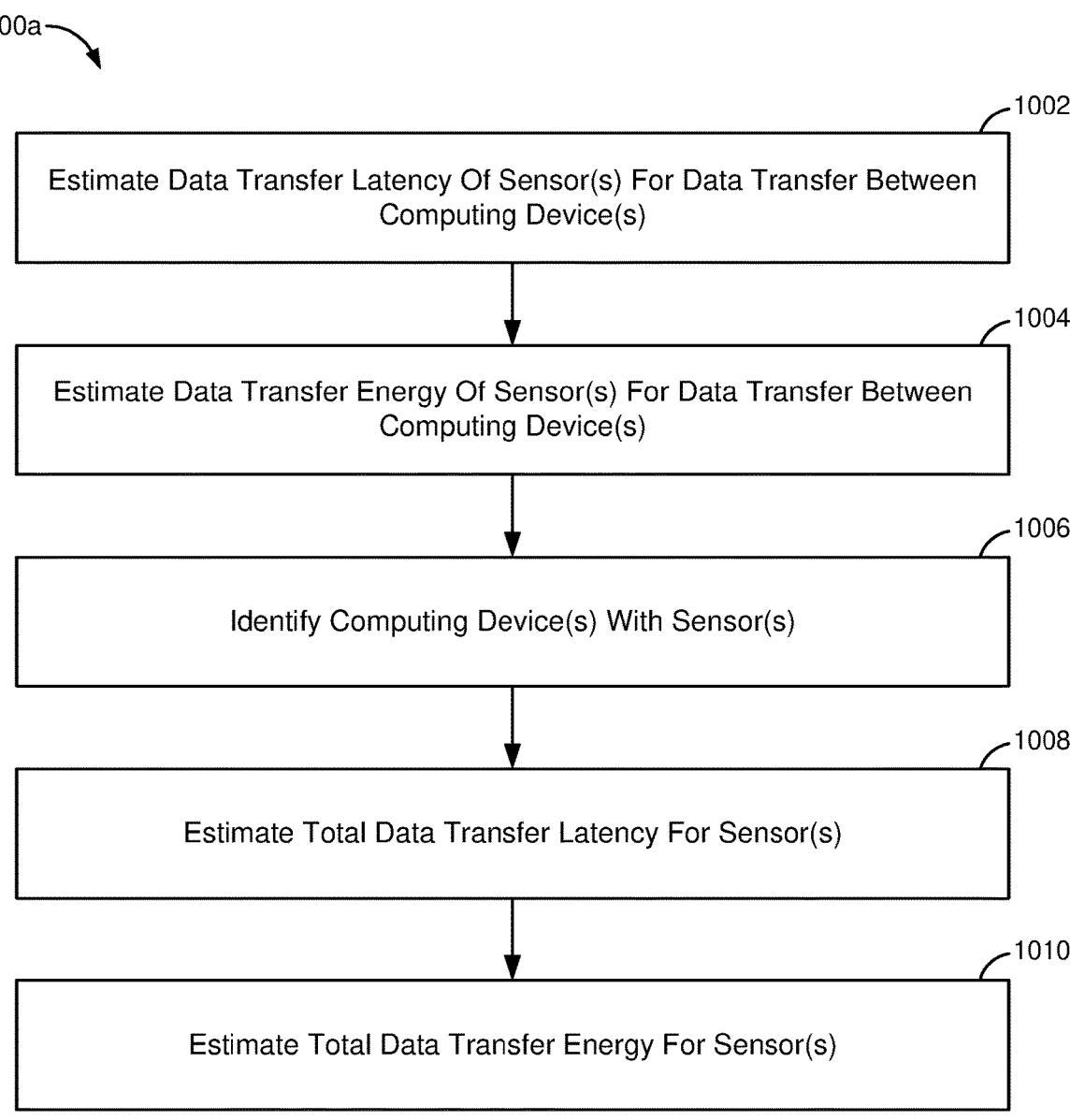

FIGS. 10A and 10B illustrate examples of methods for estimating data transfer latency and energy for distributing compute operation across connected computing devices in accordance with various embodiments. With reference to FIGS. 1-10B, the methods 1000a, 1000b may be implemented in a computing device (e.g., wired and/or wireless computing device 102a-102l in FIG. 1, wired and/or wireless computing device 302a, 302b in FIG. 3, computing device 400a-400c in FIG. 4), in general purpose hardware, in dedicated hardware, in software executing in a processor (e.g., processor 210, 212, 214, 216, 218, 252, 260 in FIG. 2, processor 306, module 310-318 in FIG. 3), or in a combination of a software-configured processor and dedicated hardware, such as a processor executing software within a communication system (e.g., communication system 100 in FIG. 1, communication system 300 in FIG. 3) that includes other individual components, and various memory/cache controllers (e.g., memory 220, 258 in FIG. 2, electronic storage 304 in FIG. 3). In order to encompass the alternative configurations enabled in various embodiments, the hardware implementing the methods 1000a, 1000b is referred to herein as a "processing device." The methods 1000a, 1000b may further describe aspects of determining the factors for selecting the one or more computing devices as a sensor computing device and an execution computing device in block 810 of the method 800 described herein with reference to FIG. 8.

Referring to FIG. 10A, in block 1002, the processing device may estimate data transfer latency of one or more sensors for data transfer between one or more computing devices (e.g., wired and/or wireless computing device 102a-102l in FIG. 1, wired and/or wireless computing device 302a, 302b in FIG. 3, computing device 400a-400c in FIG. 4). The processing device may retrieve information relating to data transfer for executing a work item of a request to execute the work item, received in block 808 of the method 800 described herein with reference to FIG. 8, and/or to data transfer speed between computing devices of context information (e.g., context information 500 in FIG. 5) of the computing devices for calculating the one or more estimates. The processing device may estimate data transfer latency between computing devices using an amount of data for executing the work item from work item parameters (e.g., work item parameters 600 in FIG. 6) of the work item and a data transfer speed between the computing devices from the context information of the computing devices. The processing device may estimate the data transfer latency for any of the one or more sensors, such as all the sensors and/or a subset of the sensors. For example, the subset of the sensors may include the one or more sensors identified in block 904 of the method 900*a* as described and/or in block 912 of the method 900*b* as described. In some embodiments, the processing device estimating data transfer latency of the one or more sensors for data transfer between the one or more computing devices in block 1002 may be a processor (e.g., processor 210, 212, 214, 216, 218, 252, 260 in FIG. 2, processor 306, module 310-318 in FIG. 3), a context information module (e.g., context information module 312 in FIG. 3), and/or a factor module (e.g., factor module 314 in FIG. 3).

In block 1004, the processing device may estimate data transfer energy of one or more sensors for data transfer between one or more computing devices. The processing device may retrieve information relating to data energy for executing the work item and/or to data transfer energy between computing devices of the context information of the computing devices for calculating the one or more estimates. The processing device may estimate data transfer energy between computing devices using an amount of data for executing the work item from the work item parameters of the work item and a data transfer energy between the computing devices from the context information of the computing devices. The processing device may estimate the data transfer energy for any of the one or more sensors, such as all the sensors and/or a subset of the sensors. For example, the subset of the sensors may include the one or more sensors identified in block 904 of the method 900*a* as described and/or in block 912 of the method 900*b* as described. In some embodiments, the processing device estimating data transfer energy of the one or more sensors for data transfer between the one or more computing devices in block 1004 may be the processor, the context information module, and/or the factor module.

In block 1006, the processing device may identify one or more computing devices with the one or more sensors. The processing device may use the context information to identify which computing devices include which sensors. In some embodiments, the one or more computing devices may be grouped by features, such as having a type of sensor, and the one or more computing devices with one or more sensors may be identified for each group. In some embodiments, the processing device identifying the one or more computing devices with the one or more sensors in block 1006 may be the processor, the context information module, and/or the factor module.

In block 1008, the processing device may estimate total data transfer latency for one or more combinations of the one or more sensors. The processing device may estimate total data transfer latency for one or more combinations of the one or more sensors using one or more of the estimates of data transfer latency calculated in block 1002. For example, the processing device may use one and/or sum multiple of the estimates of data transfer latency calculated in block 1002. As another example, the processing device may estimate total data transfer latency for combinations of the one or more sensors belonging to one and/or a group of computing devices as identified in block 1006. As another example, the processing device may estimate total data transfer latency for combinations of the one or more sensors grouped by features, such as being of a type of sensor. In some embodiments, the processing device estimating total data transfer latency for the one or more combinations of the one or more sensors in block 1008 may be the processor and/or the factor module.

In block 1010, the processing device may estimate total data transfer energy for one or more combinations of the one or more sensors. The processing device may estimate total data transfer energy for one or more combinations of the one or more sensors using the one or more of the estimates of data transfer energy calculated in block 1004. For example, the processing device may use one and/or sum multiple of the estimates of data transfer energy calculated in block 1004. As another example, the processing device may estimate total data transfer energy for combinations of the one or more sensors belonging to one and/or a group of computing devices as identified in block 1006. As another example, the processing device may estimate total data transfer energy for combinations of the one or more sensors grouped by features, such as being of a type of sensor. In some embodiments, the processing device estimating total data transfer latency for the one or more combinations of the one or more sensors in block 1010 may be the processor and/or the factor module.

Referring to FIG. 10B, blocks 1002, 1004 may be implemented as described for the method 1000*a*. In some embodiments, the processing device estimating data transfer latency of the one or more sensors for data transfer between the one or more computing devices in block 1002, and estimating data transfer energy of the one or more sensors for data transfer between the one or more computing devices in block 1004 may be a processor (e.g., processor 210, 212, 214, 216, 218, 252, 260 in FIG. 2, processor 306, module 310-318 in FIG. 3), a context information module (e.g., context information module 312 in FIG. 3), and/or a factor module (e.g., factor module 314 in FIG. 3).

In block 1020, the processing device may identify one or more computing devices with one or more sensors having at most a threshold data transfer latency. The processing device may use the one or more estimates of data transfer latency calculated in block 1002 to identify the one or more computing devices with the one or more sensors having at most the threshold data transfer latency. For example, the threshold data transfer latency may be a fixed value to which the processing device may compare the one or more estimates of data transfer latency. The one or more computing devices with the one or more sensors for which the one or more estimates of data transfer latency are at most the threshold data transfer latency may be identified. As another example, the threshold data transfer latency may be a dynamic value to which the processing device may compare the one or more estimates of data transfer latency. In such a manner, the processing device may identify one or more computing devices with one or more sensors having estimates of data transfer latency that are at most the threshold data transfer latency. The processing device may update to the threshold data transfer latency based on a compared estimate of data transfer latency falling below the threshold data transfer latency. In such a manner, the processing device may identify one or more computing devices with one or more sensors having least estimates of data transfer latency. As another example, the threshold data transfer latency may be a relative value, such as a minimum value among the compared estimates of data transfer latency. In such a manner, the processing device may identify one or more computing devices with one or more sensors having least estimates of data transfer latency. In some embodiments, the one or more computing devices may be grouped by features, such as having a type of sensor, and the one or more computing devices with one or more sensors having at most the threshold data transfer latency may be identified for each group. In some embodiments, the processing device identifying the one or more computing devices with the one or more sensors having at most the threshold data transfer latency in block 1020 may be the processor and/or the factor module.

In block 1022, the processing device may identify data transfer latency for the one or more computing devices with the one or more sensors having at most the threshold data transfer latency. The processing device may use the one or more estimates of data transfer latency calculated in block 1002 to identify the data transfer latency for the one or more computing devices with the one or more sensors having at most the threshold data transfer latency, as identified in block 1020. In some embodiments, the processing device may identify the data transfer latency for the one or more computing devices with the one or more sensors having at most the threshold data transfer latency for each group of computing devices. In some embodiments, the processing device identifying the data transfer latency for the one or more computing devices with the one or more sensors having at most the threshold data transfer latency in block 1022 may be the processor and/or the factor module.

In block 1024, the processing device may identify data transfer energy for the one or more computing devices with the one or more sensors having at most the threshold data transfer latency. The processing device may use the one or more estimates of data transfer energy calculated in block 1004 to identify the data transfer energy for the one or more computing devices with the one or more sensors having at most the threshold data transfer latency, as identified in block 1020. In some embodiments, the processing device may identify the data transfer energy for the one or more computing devices with the one or more sensors having at most the threshold data transfer latency for each group of computing devices. In some embodiments, the processing device identifying the data transfer energy for the one or more computing devices with the one or more sensors having at most the threshold data transfer latency in block 1024 may be the processor and/or the factor module.

In block 1026, the processing device may estimate total data transfer latency for one or more combinations of the one or more computing devices with the one or more sensors having at most the threshold data transfer latency. The processing device may estimate total data transfer latency for one or more combinations of the one or more computing devices with the one or more sensors having at most the threshold data transfer latency using the one or more data transfer latencies identified in block 1022. For example, the processing device may sum the data transfer latencies identified in block 1022. In some embodiments, the processing device estimating total data transfer latency for the one or more combinations of the one or more computing devices with the one or more sensors having at most the threshold data transfer latency in block 1026 may be the processor and/or the factor module.

In block 1028, the processing device may estimate total data transfer energy for one or more combinations of the one or more computing devices with the one or more sensor having at most the threshold data transfer latency. The processing device may estimate total data transfer energy for one or more combinations of the one or more computing devices with the one or more sensors having at most the threshold data transfer latency using the one or more data transfer energies identified in block 1024. For example, the processing device may sum the data transfer energies identified in block 1024. In some embodiments, the processing device estimating total data transfer latency for the one or more combinations of the one or more computing devices with the one or more sensors having at most the threshold data transfer latency in block 1028 may be the processor and/or the factor module.

Figure 11A:
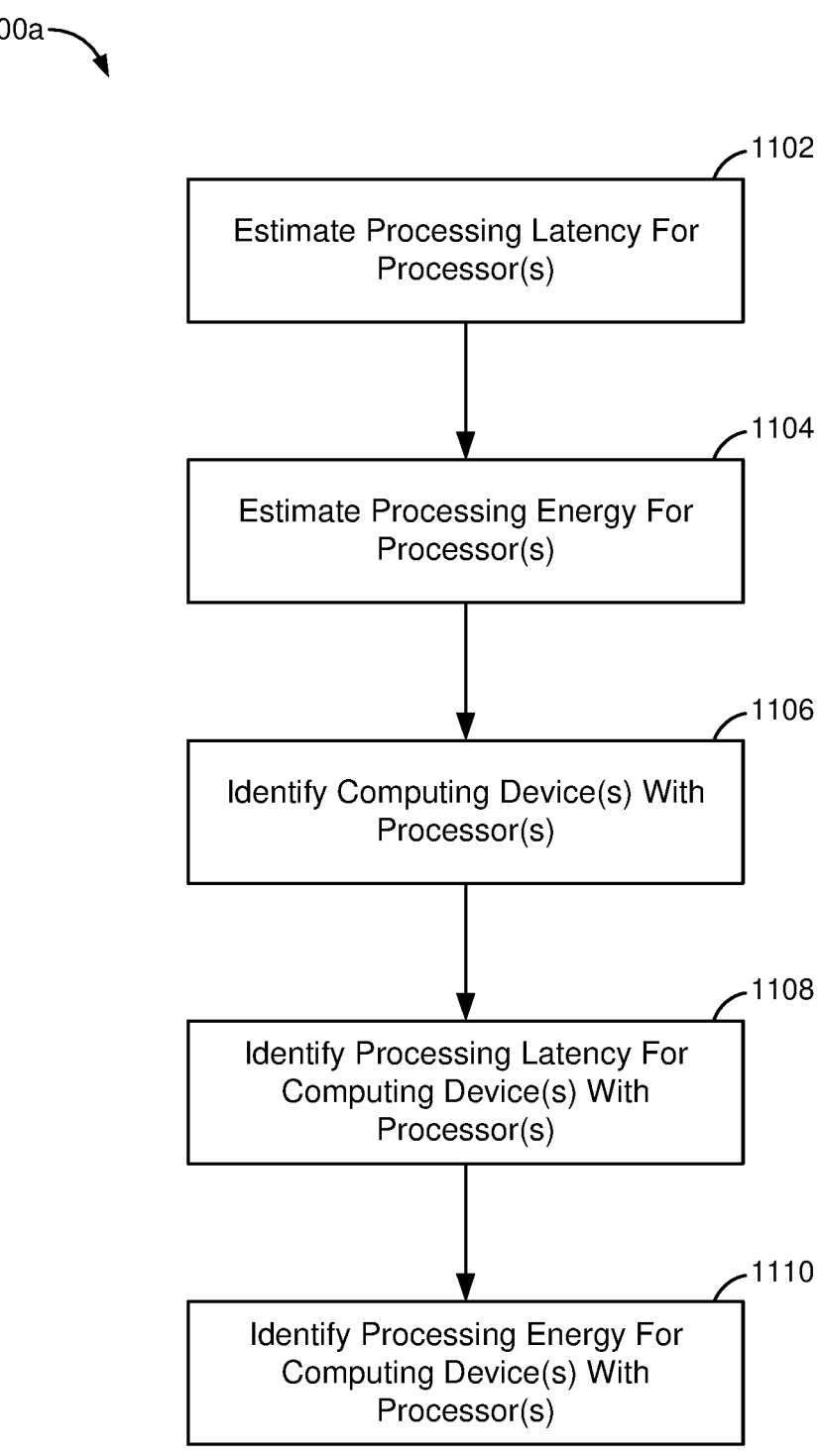
FIGS. 11A and 11B are process flow diagrams illustrating examples of methods for estimating processing latency and energy for distributing compute operation across connected wired or wireless computing devices in accordance with various embodiments.
Figure 11B:
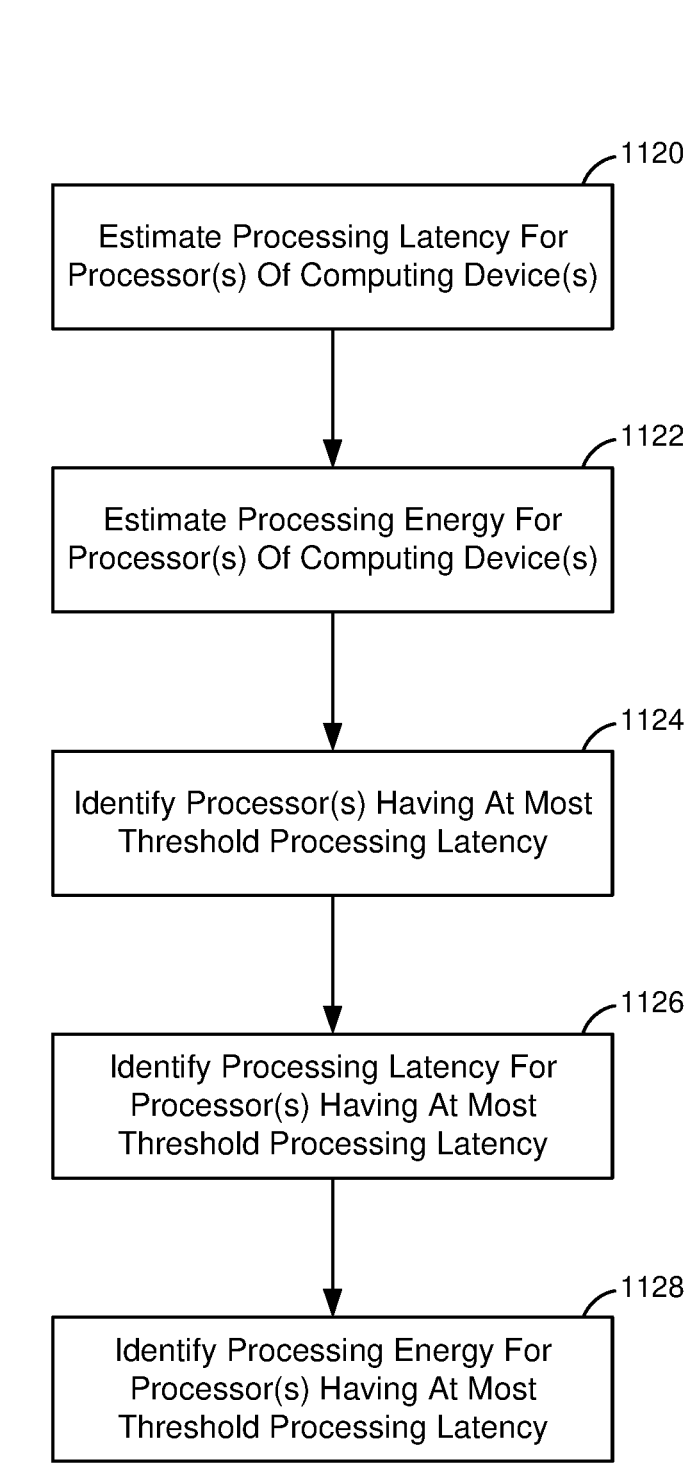

FIGS. 11A and 11B illustrate examples of methods for estimating processing latency and energy for distributing compute operation across connected computing devices in accordance with various embodiments. With reference to FIGS. 1-11B, the methods 1100*a*, 1100*b* may be implemented in a computing device (e.g., wired and/or wireless computing device 102*a*-102*l* in FIG. 1, wired and/or wireless computing device 302*a*, 302*b* in FIG. 3, computing device 400*a*-400*c* in FIG. 4), in general purpose hardware, in dedicated hardware, in software executing in a processor (e.g., processor 210, 212, 214, 216, 218, 252, 260 in FIG. 2, processor 306, module 310-318 in FIG. 3), or in a combination of a software-configured processor and dedicated hardware, such as a processor executing software within a communication system (e.g., communication system 100 in FIG. 1, communication system 300 in FIG. 3) that includes other individual components, and various memory/cache controllers (e.g., memory 220, 258 in FIG. 2, electronic storage 304 in FIG. 3). In order to encompass the alternative configurations enabled in various embodiments, the hardware implementing the methods 1100*a*, 1100*b* is referred to herein as a "processing device." The methods 1100*a*, 1100*b* may further describe aspects of determining the factors for selecting the one or more computing devices as a sensor computing device and an execution computing device in block 810 of the method 800 described herein with reference to FIG. 8.

Referring to FIG. 11A, in block 1102, the processing device may estimate processing latency for one or more processors. The processing device may retrieve information relating to processing a work item of a request to execute the work item, received in block 808 of the method 800 described herein with reference to FIG. 8, and/or to processor information of context information (e.g., context information 500 in FIG. 5) of one or more computing devices (e.g., wired and/or wireless computing device 102*a*-102*l* in FIG. 1, wired and/or wireless computing device 302*a*, 302*b* in FIG. 3, computing device 400*a*-400*c* in FIG. 4) for calculating the one or more estimates. The processing device may estimate processing latency of one or more processors using a latency parameter for processing the work item from work item parameters (e.g., work item parameters 600 in FIG. 6) of the work item and a processor power from the context information of the computing devices. The latency parameter may be a value for latency in relation to an aspect of a processor, such as processor power. In some embodiments, the processing device estimating processing latency for the one or more processors in block 1102 may be a processor (e.g., processor 210, 212, 214, 216, 218, 252, 260 in FIG. 2, processor 306, module 310-318 in FIG. 3), a context information module (e.g., context information module 312 in FIG. 3), and/or a factor module (e.g., factor module 314 in FIG. 3).

In block 1104, the processing device may estimate processing energy for one or more processors. The processing device may retrieve information relating to processing energy of one or more processors from the context information of the computing devices for calculating the one or more estimates. The processing device may estimate processing energy for one or more processors using an estimate of processing latency for one or more processors calculated in block 1102 and a processing energy of the one or more processors from the context information of the computing devices. In some embodiments, the processing device estimating processing energy for the one or more processors in block 1104 may be the processor, the context information module, and/or the factor module.

In block 1106, the processing device may identify one or more computing devices with the one or more processors. The processing device may use the context information to identify which computing devices include which processors. In some embodiments, the one or more computing devices may be grouped by features, such as having a type of processor, and the one or more computing devices with one or more processors may be identified for each group. In some embodiments, the processing device identifying the one or more computing devices with the one or more processors in block 1106 may be the processor, the context information module, and/or the factor module.

In block 1108, the processing device may identify processing latency for the one or more computing devices with the one or more processors. The processing device may use the one or more estimates of processing latency calculated in block 1102 to identify the processing latency for the one or more computing devices with the one or more processors, as identified in block 1106. For example, the processing device may use one and/or sum multiple of the estimates of processing latency calculated in block 1102 for one or more processors of each computing device. As another example, the processing device may estimate total processing latency for combinations of the one or more processors belonging to one and/or a group of computing devices as identified in block 1106. As another example, the processing device may estimate total processing latency for combinations of the one or more processors of the one or more computing devices grouped by features, such as being of a type of processor. In some embodiments, the processing device identifying the processing latency for the one or more computing devices with the one or more processors in block 1108 may be the processor and/or the factor module.

In block 1110, the processing device may identify processing energy for the one or more computing devices with the one or more processors. The processing device may use the one or more estimates of processing energy calculated in block 1104 to identify the processing energy for the one or more computing devices with the one or more processors, as identified in block 1106. For example, the processing device may use one and/or sum multiple of the estimates of processing energy calculated in block 1104 for one or more processors of each computing device. As another example, the processing device may estimate total processing energy for combinations of the one or more processors belonging to one and/or a group of computing devices as identified in block 1106. As another example, the processing device may estimate total processing energy for combinations of the one or more processors of the one or more computing devices grouped by features, such as being of a type of processor. In some embodiments, the processing device identifying the processing energy for the one or more computing devices with the one or more processors in block 1110 may be the processor and/or the factor module.

With reference to FIG. 11B, blocks 1120, 1122 may be implemented in similar manners as blocks 1102, 1104 of the method 1100a as described. In some embodiments, the processing device estimating processing latency for the one or more processors of the one or more computing devices in block 1120, and estimating processing energy for the one or more processors of the one or more computing devices in block 1122 may be a processor (e.g., processor 210, 212, 214, 216, 218, 252, 260 in FIG. 2, processor 306, module 310-318 in FIG. 3), a context information module (e.g., context information module 312 in FIG. 3), and/or a factor module (e.g., factor module 314 in FIG. 3).

In block 1124, the processing device may identify one or more processors having at most a threshold processing latency. For example, the threshold processing latency may be a fixed value to which the processing device may compare the one or more estimates of processing latency. The one or more computing devices with the one or more processors for which the one or more estimates of processing latency are at most the threshold processing latency may be identified. As another example, the threshold processing latency may be a dynamic value to which the processing device may compare the one or more estimates of processing latency. In such a manner, the processing device may identify one or more computing devices with one or more processors having estimates of processing latency that are at most the threshold processing latency. The processing device may update to the threshold processing latency based on a compared estimate of processing latency falling below the threshold processing latency. In such a manner, the processing device may identify one or more computing devices with one or more processors having least estimates of processing latency. As another example, the threshold processing latency may be a relative value, such as a minimum value among the compared estimates of processing latency. In such a manner, the processing device may identify one or more computing devices with one or more processors having least estimates of processing latency. In some embodiments, the one or more computing devices may be grouped by features, such as having a type of processor, and the one or more computing devices with one or more processors having at most the threshold processing latency may be identified for each group. In some embodiments, the processing device identifying the one or more computing devices with the one or more processors having at most the threshold processing latency in block 1124 may be the processor and/or the factor module.

In block 1126, the processing device may identify processing latency for one or more processors having at most threshold processing latency. The processing device may use the one or more estimates of processing latency calculated in block 1102 to identify the processing latency for the one or more computing devices with the one or more processors having at most the threshold processing latency, as identified in block 1124. In some embodiments, the processing device may identify the processing latency for the one or more computing devices with the one or more processors having at most the threshold processing latency for each group of computing devices. In some embodiments, the processing device identifying the processing latency for the one or more computing devices with the one or more processors having at most the threshold processing latency in block 1126 may be the processor and/or the factor module.

In block 1128, the processing device may identify processing energy for one or more processors having at most threshold processing latency. The processing device may use the one or more estimates of processing energy calculated in block 1104 to identify the processing energy for the one or more computing devices with the one or more processors having at most the threshold processing latency, as identified in block 1124. In some embodiments, the processing device may identify the processing energy for the one or more computing devices with the one or more processors having at most the threshold processing latency for each group of computing devices. In some embodiments, the processing device identifying the processing energy for the one or more computing devices with the one or more processors having at most the threshold processing latency in block 1128 may be the processor and/or the factor module.

FIGS. 12A and 12B illustrate examples of methods for estimating processing latency and energy for distributing compute operation across connected computing devices in accordance with various embodiments. With reference to FIGS. 1-12B, the methods 1200a, 1200b may be implemented in a computing device (e.g., wired and/or wireless computing device 102a-102l in FIG. 1, wired and/or wireless computing device 302a, 302b in FIG. 3, computing device 400a-400c in FIG. 4), in general purpose hardware, in dedicated hardware, in software executing in a processor (e.g., processor 210, 212, 214, 216, 218, 252, 260 in FIG. 2, processor 306, module 310-318 in FIG. 3), or in a combination of a software-configured processor and dedicated hardware, such as a processor executing software within a communication system (e.g., communication system 100 in FIG. 1, communication system 300 in FIG. 3) that includes other individual components, and various memory/cache controllers (e.g., memory 220, 258 in FIG. 2, electronic storage 304 in FIG. 3). In order to encompass the alternative configurations enabled in various embodiments, the hardware implementing the methods 1200a, 1200b is referred to herein as a "processing device." The methods 1200a, 1200b may further describe aspects of determining the factors for selecting the one or more computing devices as a sensor computing device and an execution computing device in block 810 of the method 800 as described.

The methods 1200a, 1200b may be optionally implemented depending on whether the computing devices (e.g., wired and/or wireless computing device 102a-102l in FIG. 1, wired and/or wireless computing device 302a, 302b in FIG. 3, computing device 400a-400c in FIG. 4), from which the one or more execution computing devices may be selected, include one or more batteries and/or have a state of charging the batteries (e.g., powered by an external power source).

Referring to FIG. 12A, in block 1202, the processing device may estimate a battery level of one or more computing devices for after executing a work item. The processing device may retrieve information relating to processing energy for one or more processors, identified in block 1110 of the method 1100a as described, and/or to battery information of context information (e.g., context information 500 in FIG. 5) of the computing devices for calculating the one or more estimates. The processing device may estimate the battery level after executing the work item using an estimate of processing energy required for processing the work item by one or more processors of one or more computing devices and a battery level from the context information of the computing devices. In some embodiments, the processing device estimating the battery level of the one or more computing devices after executing the work item in block 1202 may be a processor (e.g., processor 210, 212, 214, 216, 218, 252, 260 in FIG. 2, processor 306, module 310-318 in FIG. 3), a context information module (e.g., context information module 312 in FIG. 3), and/or a factor module (e.g., factor module 314 in FIG. 3).

In block 1204, the processing device may identify one or more computing devices for which the battery level is estimated after executing the work item. The processing device may use the context information estimated in block 1102 to identify which computing devices include the batteries for which the battery level is estimated after executing the work item. In some embodiments, the one or more computing devices may be grouped by features, such as battery type, size, level, etc., and the one or more computing devices for which the battery level is estimated after executing the work item may be identified for each group. In some embodiments, the processing device identifying the one or more computing devices for which the battery level is estimated in block 1204 may be the processor, the context information module, and/or the factor module.

Referring to FIG. 12B, in block 1210, the processing device may estimate a battery level of one or more computing devices after executing a work item. The processing device may retrieve information relating to processing energy for one or more processors having at most threshold processing latency, identified in block 1128 of the method 1100b as described, and/or to battery information of context information (e.g., context information 500 in FIG. 5) of the computing devices for calculating the one or more estimates. The processing device may estimate battery level after executing the work item using an estimate of processing energy for processing the work item by one or more processors of one or more computing devices and a battery level from the context information of the computing devices. In some embodiments, the processing device estimating the battery level of the one or more computing devices in block 1210 may be a processor (e.g., processor 210, 212, 214, 216, 218, 252, 260 in FIG. 2, processor 306, module 310-318 in FIG. 3), a context information module (e.g., context information module 312 in FIG. 3), and/or a factor module (e.g., factor module 314 in FIG. 3).

In block 1212, the processing device may identify one or more computing devices having at least a threshold battery level after executing the work item. For example, the threshold battery level after executing the work item may be a fixed value to which the processing device may compare the one or more estimates of battery level after executing the work item. The one or more computing devices for which the one or more estimates of battery level after executing the work item are at least the threshold battery level after executing the work item may be identified. As another example, the threshold battery level after executing the work item may be a dynamic value to which the processing device may compare the one or more estimates of battery level after executing the work item. In such a manner, the processing device may identify one or more computing devices having estimates of battery level after executing the work item that are at least the threshold battery level after executing the work item. The processing device may update to the threshold battery level based on a compared estimate of battery level after executing the work item exceeding the threshold battery level after executing the work item. In such a manner, the processing device may identify one or more computing devices one or more processors having greatest battery level after executing the work item. As another example, the threshold battery level after executing the work item may be a relative value, such as a maximum value among the compared estimates of battery level after executing the work item. In such a manner, the processing device may identify one or more computing devices having greatest battery level after executing the work item. In some embodiments, the processing device identifying the one or more computing devices having at least the threshold battery level after executing the work item in block 1212 may be the processor and/or the factor module.

In block 1214, the processing device may select one or more computing devices having at least the threshold battery level for after executing the work item. The processing device may select the one or more computing devices having at least threshold battery level for after executing the work item identified in block 1212. Computing devices falling short of the threshold battery level for after executing the work item may be ignored. The processing device selecting the one or more computing devices having at least the threshold battery level for after executing the work item in block 1214 may be the processor and/or a computing device selection module (e.g., computing device selection module 316 in FIG. 3).

Figure 13A:
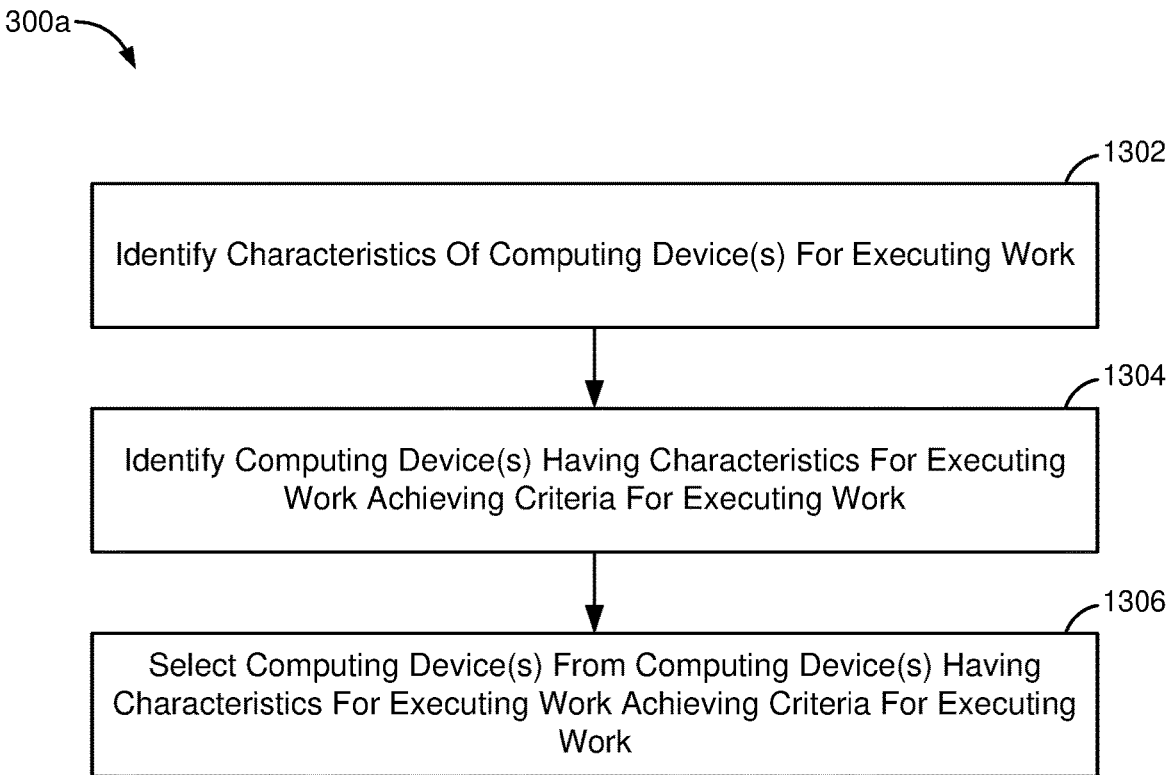
FIGS. 13A and 13B are process flow diagrams illustrating examples of methods for selecting at least one wired or wireless computing device for distributing compute operation across connected wired or wireless computing devices in accordance with various embodiments.
Figure 13B:
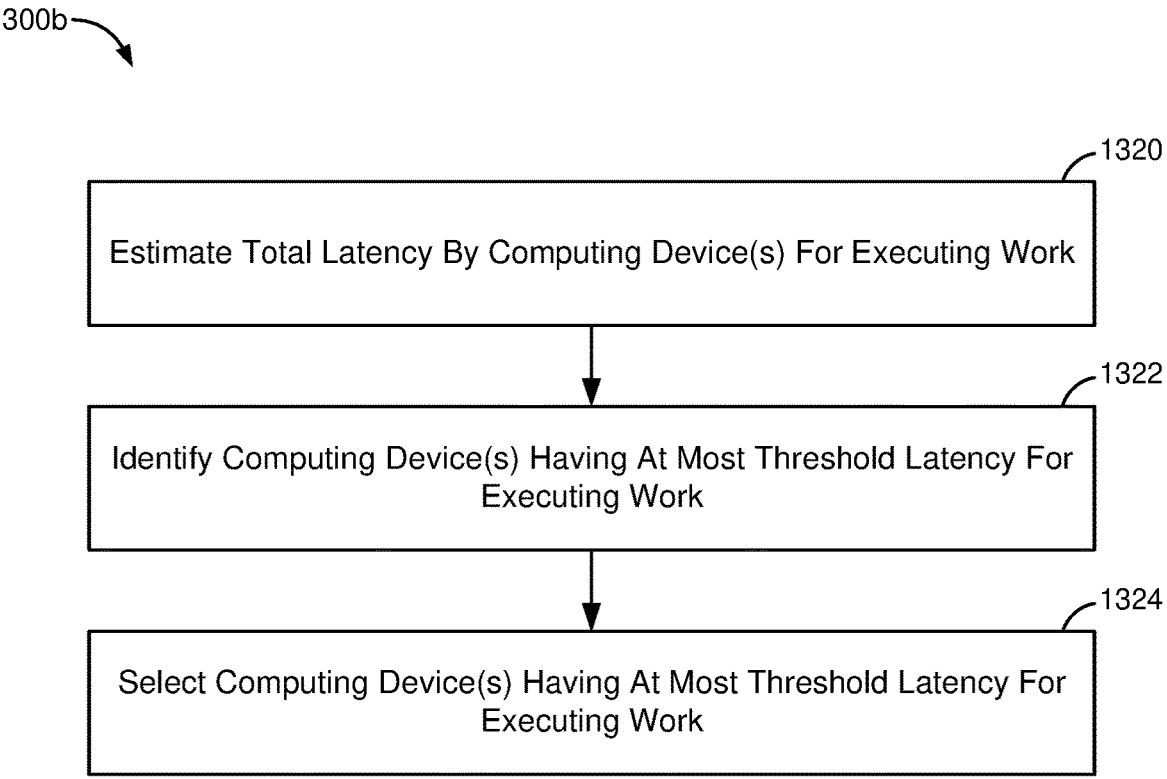

FIGS. 13A and 13B illustrate examples of methods for selecting at least one network-WPAN-connected computing device for distributing compute operation across connected computing devices in accordance with various embodiments. With reference to FIGS. 1-13B, the methods 1300a, 1300b may be implemented in a computing device (e.g., wired and/or wireless computing device 102a-102l in FIG. 1, wired and/or wireless computing device 302a, 302b in FIG. 3, computing device 400a-400c in FIG. 4), in general purpose hardware, in dedicated hardware, in software executing in a processor (e.g., processor 210, 212, 214, 216, 218, 252, 260 in FIG. 2, processor 306, module 310-318 in FIG. 3), or in a combination of a software-configured processor and dedicated hardware, such as a processor executing software within a communication system (e.g., communication system 100 in FIG. 1, communication system 300 in FIG. 3) that includes other individual components, and various memory/cache controllers (e.g., memory 220, 258 in FIG. 2, electronic storage 304 in FIG. 3). In order to encompass the alternative configurations enabled in various embodiments, the hardware implementing the methods 1300a, 1300b is referred to herein as a "processing device." The methods 1300a, 1300b may further describe aspects of selecting the one or more computing devices as the one or more execution computing devices in block 814 of the method 800 described herein with reference to FIG. 8.

Referring to FIG. 13A, in block 1302, the processing device may identify characteristics of one or more computing devices (e.g., wired and/or wireless computing device 102a-102l in FIG. 1, wired and/or wireless computing device 302a, 302b in FIG. 3, computing device 400a-400c in FIG. 4) for executing the work item. The characteristics of the one or more computing devices for executing the work item may include representations of accuracy of results, accumulation of latency, and/or accumulation of energy use. The characteristics of the one or more computing devices for executing the work item may include and/or be generated from information gathered and/or generated during execution of the methods 800, 900a, 1000a, 1100a, 1200a described herein with reference to FIGS. 8, 9A, 10A, 11A, and 12A. In some embodiments, the processing device identifying the characteristics of one or more computing devices for executing the work item in block 1302 may be a processor (e.g., processor 210, 212, 214, 216, 218, 252, 260 in FIG. 2, processor 306, module 310-318 in FIG. 3), a factor module (e.g., factor module 314 in FIG. 3), and/or a computing device selection module (e.g., wired and/or wireless computing device selection module 316 in FIG. 3).

For example, the processing device may use the accuracy of the one or more sensors of the one or more computing devices identified in block 908 of the method 900a as described, as and/or to generate the representations of the accuracy of results to achieve for executing the work item. The processing device may use one or a combination of the data transfer latency for the one or more sensors of the one or more computing devices estimated in block 1008 of the method 1000a as described, and/or the processing latency for the one or more processors of the one or more computing devices identified in block 1108 of the method 1100a as described, as and/or to generate the representations of the accumulation of latency to achieve for executing the work item. The processing device may use one or a combination of the data transfer latency for the one or more sensors of the one or more computing devices estimated in block 1008 of the method 1000a as described, and/or the processing latency for the one or more processors of the one or more computing devices identified in block 1108 of the method 1100a as described, as and/or to generate the representations of the accumulation of latency to achieve for executing the work item. The processing device may use one or a combination of the data transfer energy for the one or more sensors of the one or more computing devices estimated in block 1010 of the method 1000a as described, the processing energy for the one or more processors of the one or more computing devices identified in block 1110 of the method 1100a as described, and/or battery level of the one or more computing devices estimated in block 1202 of the method 1200a as described, as and/or to generate the representations of the accumulation of energy use to achieve for executing the work item.

In block 1304, the processing device may identify one or more computing devices having characteristics for executing the work item that achieve criteria for executing the work item. The work item may be associated with criteria for executing the work item, for example, by work item parameters (e.g., work item parameters 600 in FIG. 6) and/or a work allocation policy (e.g., work allocation policy 700 in FIG. 7). For example, criteria for work items may include accuracy of results, accumulation of latency, and/or accumulation of energy use. Such criteria may be predetermined, configurable, and/or dynamic. In some examples, the criteria may be implemented with reference to each other, such as weighted values, including one or more ratios and/or proportions, of accuracy of results, accumulation of latency, and/or accumulation of energy use. The characteristics of the one or more computing devices for executing the work item may be compared to the criteria for executing the work item to identify which of one or more computing devices achieve the criteria for executing the work item. The processing device may compare the characteristics of individual and/or groups of computing devices to the criteria for executing the work item and identify individual and/or groups of computing devices that achieve one or more aspects of the criteria. For example, the processing device may identify individual and/or groups of computing devices that achieve one or any combination of the aspects of the criteria for executing the work item including accuracy of results, accumulation of latency, and/or accumulation of energy use. In some embodiments, the processing device identifying the characteristics of the one or more computing devices for executing the work item in block 1304 may be the processor, the factor module, and/or the computing device selection module.

In block 1306, the processing device may select one or more computing devices from the one or more computing devices having the characteristics for executing the work item that achieve the criteria for executing work item. The processing device may select one or more computing devices based on a mathematical, algorithmic, heuristic, etc. means configured to achieve the criteria for the work item. For example, the processing device may select one or more computing devices that may achieve a greatest results accuracy, a least accumulation of latency, and/or a least accumulation of energy use for executing the work item from among the computing devices. The processing device may be configured to select one or more computing devices based on a priority of one or more aspects of the criteria. For example, the one or more computing devices may not achieve the greatest and/or least levels of each aspect of the criteria but may achieve a greatest and/or least level of one or more aspects and acceptable levels for remaining criteria. The processing device may be configured to select one or more computing devices based on a combination of the criteria. For example, the one or more computing devices may not achieve a weighted value, such as a part of a ratio and/or proportions, for the aspects of the criteria. In some embodiments, the processing device selecting the one or more computing devices from the one or more computing devices having the characteristics for executing the work item that achieve the criteria for executing work item in block 1306 may be the processor and/or the computing device selection module.

Referring to FIG. 13B, in block 1320, the processing device may estimate total latency by one or more computing devices for executing the work item. The processing device may retrieve information relating to data transfer latency, such calculated in block 1026 of the method 1000b as described herein with reference to FIG. 10B, and processing latency, as identified in block 1126 of the method 1100b as described. The processing device may estimate total latency by one or more computing devices for executing the work item using an estimate of data transfer latency between the one or more computing devices and an estimate of processing latency for processing the work item by one or more of the computing devices. In some examples, the computing devices for which the processing device may estimate total latency may include the one or more computing devices having at least the threshold battery level after executing the work item selected in block 1214 of the method 1200b as described. In some embodiments, the processing device estimating total latency by the one or more computing devices for executing the work item in block 1320 may be the processor and/or the factor module.

In block 1322, the processing device may identify one or more computing devices having at most threshold latency for executing the work item. For example, the threshold latency for executing the work item may be a fixed value to which the processing device may compare the one or more estimates of total latency for executing the work item. The one or more computing devices for which the one or more estimates of total latency for executing the work item are at most the threshold latency for executing the work item may be identified. As another example, the threshold latency for executing the work item may be a dynamic value to which the processing device may compare the one or more estimates of total latency for executing the work item. In such a manner, the processing device may identify one or more computing devices having estimates of total latency for executing the work item that are at most the threshold latency for executing the work item. The processing device may update to the threshold latency for executing the work item based on a compared estimate of total latency for executing the work item falling short of the threshold latency for executing the work item. In such a manner, the processing device may identify one or more computing devices having least total latency for executing the work item. As another example, the threshold latency for executing the work item may be a relative value, such as a minimum value among the compared estimates of total latency for executing the work item. In such a manner, the processing device may identify one or more computing devices having least total latency for executing the work item. In some embodiments, the processing device identifying the one or more computing devices having at most the threshold latency for executing the work item in block 1322 may be the processor and/or the factor module.

In block 1324, the processing device may select one or more computing devices having at most threshold latency for executing the work item. The processing device may select the one or more computing devices having at most threshold latency for executing the work item identified in block 1322. computing devices exceeding the threshold latency for executing the work item may be ignored. The processing device selecting the one or more computing devices having at most the threshold latency for executing the work item in block 1324 may be the processor and/or a computing device selection module.

In various examples, any part of the methods 900a, 900b, 1000a, 1000b, 1100a, 1100b, 1200a, 1200b, 1300a, 1300b may be implemented in parallel for various work items. In various examples, implementation of the methods 900a, 900b, 1000a, 1000b, 1100a, 1100b, 1200a, 1200b, 1300a, 1300b may be interrupted at any part and returned to an early part based on a change in a context information (e.g., context information 500 in FIG. 5), a work item, work item parameters (e.g., work item parameters 600 in FIG. 6), and/or work allocation policy (e.g., work allocation policy 700 in FIG. 7), etc.

Figure 14:
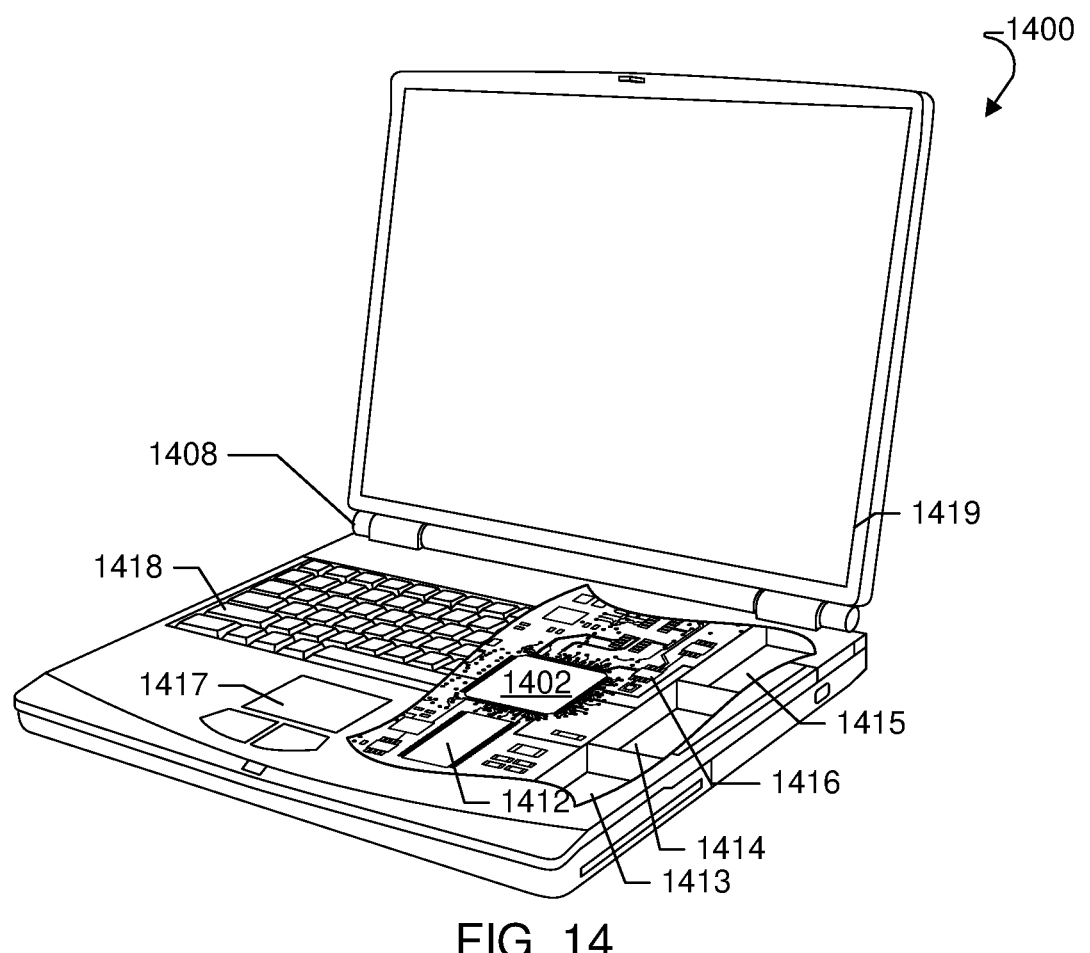
FIG. 14 is a component block diagram illustrating an example wired or wireless computing device.

Various embodiments, including methods 800, 900a, 900b, 1000a, 1000b, 1100a, 1100b, 1200a, 1200b, 1300a, 1300b may be performed in a variety of computing devices (e.g., wired and/or wireless computing device 102a-102l in FIG. 1, wired and/or wireless computing device 302a, 302b in FIG. 3, computing device 400a-400c in FIG. 4), an example of which is illustrated in FIG. 14, which illustrates and example of a computing device 1400 suitable for use with various embodiments. With reference to FIGS. 1-14, a computing device 1400 may include a touchpad touch surface 1417 that serves as the computer's pointing device, and thus may receive drag, scroll, and flick gestures similar to those implemented on computing devices equipped with a touch screen display and described above. The computing device 1400 will typically include a processor 1402 coupled to volatile memory 1412 and a large capacity nonvolatile memory, such as a disk drive 1413 of Flash memory. Additionally, the computing device 1400 may have one or more antenna 1408 for sending and receiving electromagnetic radiation that may be connected to a wireless data link and/or cellular telephone transceiver 1416 coupled to the processor 1402. The computing device 1400 may also include a floppy disc drive 1414 and a compact disc (CD) drive 1415 coupled to the processor 1402. In a notebook configuration, the computer housing includes the touchpad 1417, the keyboard 1418, and the display 1419 all coupled to the processor 1402. Other configurations of the computing device may include a computer mouse or trackball coupled to the processor (e.g., via a USB input) as are well known, which may also be used in conjunction with the various embodiments.

Figure 15:
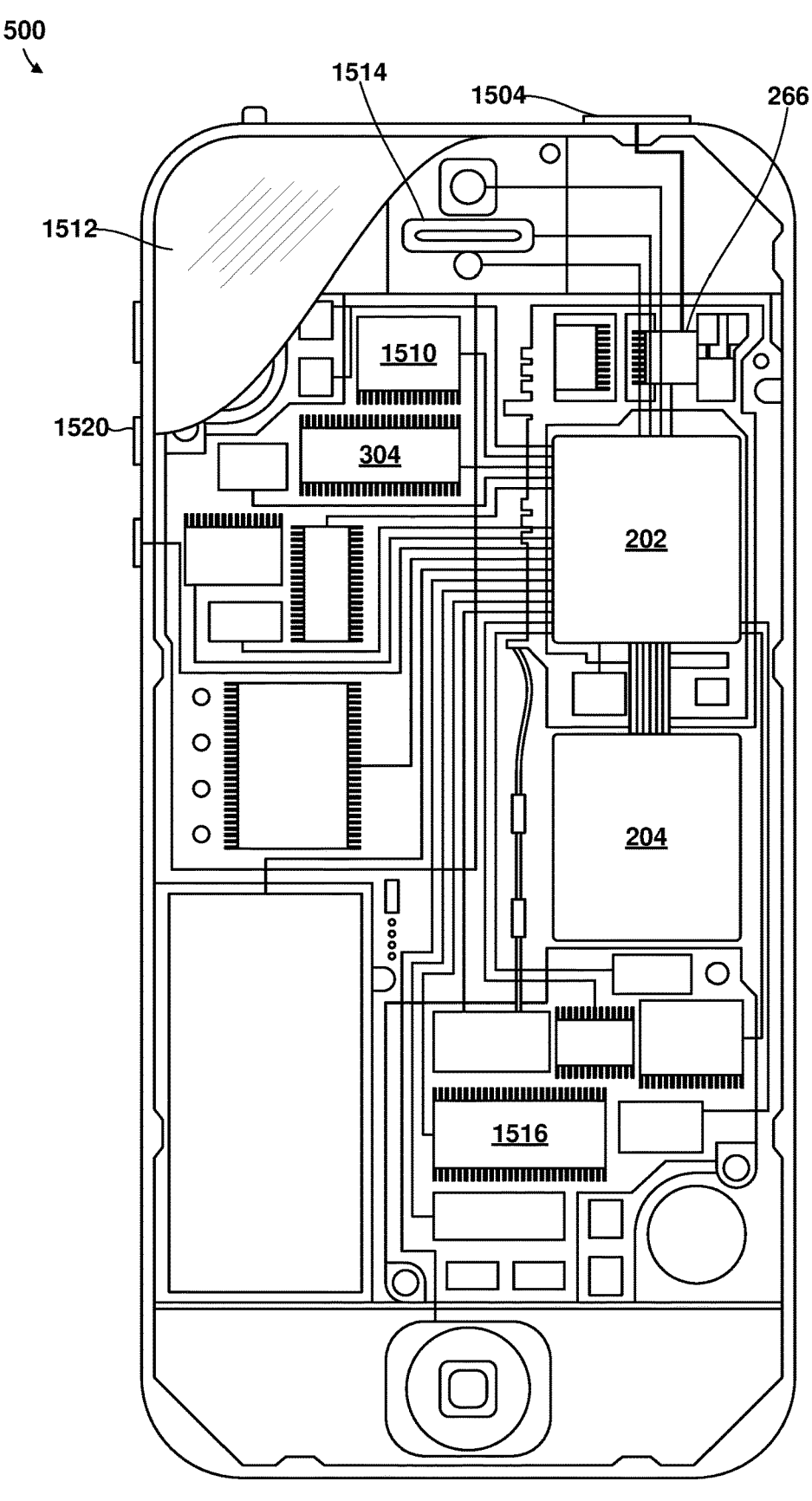
FIG. 15 is a component block diagram illustrating an example wired or wireless computing device.

Various embodiments, including methods 800, 900a, 900b, 1000a, 1000b, 1100a, 1100b, 1200a, 1200b, 1300a, 1300b may be performed in a variety of computing devices (e.g., wired and/or wireless computing device 102a-102l in FIG. 1, wired and/or wireless computing device 302a, 302b in FIG. 3, computing device 400a-400c in FIG. 4), an example of which is illustrated in FIG. 15, which illustrates and example of a computing device 1500 suitable for use with various embodiments. With reference to FIGS. 1-15, a computing device 1500 may include a first SOC 202 (e.g., a SOC-CPU) coupled to a second SOC 204 (e.g., a 5G capable SOC). The first and second SOCs 202, 204 may be coupled to internal memory 304, 1516, a display 1512, and to a speaker 1514. Additionally, the computing device 1500 may include an antenna 1504 for sending and receiving electromagnetic radiation that may be connected to a wired data link, wireless data link and/or cellular telephone transceiver 266 coupled to one or more processors in the first and/or second SOCs 202, 204. The computing device 1400 may also include menu selection buttons or rocker switches 1520 for receiving user inputs.

The computing device 1500 also may include a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1510 may include a digital signal processor (DSP) circuit (not shown separately).

The processors of the computing device 1400, 1500 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 304, 1412, 1413, 1516 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a transmitter wireless communication device including a processing device configured with processor-executable instructions to perform operations of the example methods; the example methods discussed in the following paragraphs implemented by a computing device including means for performing functions of the example methods; and the example methods discussed in the following paragraphs implemented as a non-transitory, processor-readable medium having stored thereon processor-executable instructions configured to cause a processor of a computing device to perform operations of the example methods.

Example 1. A method for distributing compute operation across connected computing devices, performed in a processor of a first computing device, the method including: establishing an ad hoc communication connection with a second computing device, in which the ad hoc communication connection is part of a network of a plurality of computing devices communicatively connected via a plurality of ad hoc communication connections; receiving context information of the second computing device via the ad hoc communication connection; selecting at least one sensor computing device from the plurality of computing devices; selecting at least one execution computing device from the plurality of computing devices; assigning a data gathering part of a work item to the at least one sensor computing device; and assigning an execution part of the work item to the at least one execution computing device.

Example 2. The method of example 1, further including determining factors for selecting at least one computing device based on a plurality of context data of the plurality of computing devices, in which: selecting the at least one sensor computing device includes selecting the at least one sensor computing device using factors determined from context data of the at least one sensor computing device and context data of the at least one execution computing device; and selecting the at least one execution computing device includes selecting the at least one execution computing device using factors determined from context data of the at least one sensor computing device and context data of the at least one execution computing device.

Example 3. The method of example 2, in which determining the factors for selecting the at least one computing device based on the plurality of context data of the plurality of computing devices includes: identifying an accuracy of results for executing the work item based on an accuracy of at least one sensor at each of at least two computing devices of the plurality of computing devices; identifying an accumulated latency for executing the work item by at least one computing device of the plurality of computing devices; and identifying an accumulated energy use for executing the work item by at least one computing devices of the plurality of computing devices.

Example 4. The method of example 3, in which: selecting the at least one sensor computing device using the factors determined from the context data of the at least one sensor computing device and the context data of the at least one execution computing device includes selecting the at least one sensor computing device based on criteria of the accuracy of results for executing the work item, the accumulated latency for executing the work item, and the accumulated energy use for executing the work item; and selecting the at least one execution computing device using the factors determined from the context data of the at least one sensor computing device and the context data of the at least one execution computing device includes selecting the at least one execution computing device based on the criteria of the accuracy of results for executing the work item, the accumulated latency for executing the work item, and the accumulated energy use for executing the work item.

Example 5. The method of example 4, in which the criteria of the accuracy of results for executing the work item, the accumulated latency for executing the work item, and the accumulated energy use for executing the work item is based on weighted values for the accuracy of results for executing the work item, the accumulated latency for executing the work item, and the accumulated energy use for executing the work item.

Example 6. The method of any of examples 2-5, in which determining the factors for selecting the at least one computing device based on the plurality of context data of the plurality of computing devices includes: calculating at least one estimate of data transfer latency between the at least one sensor computing device and the at least one execution computing device for executing the work item; calculating at least one estimate of processing latency of the at least one execution computing device for executing the work item; and calculating at least one estimate of total latency for executing the work item based on the at least one estimate of data transfer latency and the at least one estimate of processing latency, the method further including selecting the at least one computing device having the at least one estimate of total latency that is at most a threshold latency for executing the work item.

Example 7. The method of any of examples 2-5, in which determining the factors for selecting the at least one computing device based on the plurality of context data of the plurality of computing devices includes: calculating at least one estimate of data transfer energy between the at least one sensor computing device and the at least one execution computing device for executing the work item; calculating at least one estimate of processing energy of the at least one execution computing device for executing the work item; and calculating at least one estimate of total energy for executing the work item based on the at least one estimate of data transfer energy and the at least one estimate of processing energy.

Example 8. The method of example 7, further including, selecting the at least one computing device having the at least one estimate of total energy that is at most a threshold energy for executing the work item.

Example 9. The method of example 7, in which determining the factors for selecting the at least one computing device based on the plurality of context data of the plurality of computing devices includes estimating a battery level of the at least one execution computing device following executing the work item using the at least one estimate of total energy for executing the work item, the method further including selecting the at least one computing device having the at least one estimate of the battery level of the at least one execution computing device following executing the work item that is at least a threshold battery level following executing the work item.

Example 10. The method of any of examples 1-9, further including identifying at least one sensor of the at least one sensor computing device having at least a threshold sensor accuracy using sensor accuracy information from the context data of the at least one sensor computing device, in which selecting the at least one sensor computing device includes selecting the at least one sensor computing device having the at least one sensor having at least the threshold sensor accuracy.

Example 10. The method of any of examples 1-10 in which any one or all of the plurality of computing devices are wireless computing devices.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a computing device and the computing device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the operations of the methods disclosed herein may be substituted for or combined with one or more operations of the methods disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the embodiments disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Embodiments of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate embodiments also can be implemented in combination in a single implementation. Conversely, various features that are described in the context of a single implementation also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A computing device, comprising:

a transceiver configured to support ad hoc communication connections with a plurality of computing devices forming a network; and a processor coupled to the transceiver and configured to:

establish an ad hoc communication connection with the plurality of computing devices within the network;

receive context information from the plurality of computing devices via the ad hoc communication connection, wherein the context information includes sensor capabilities and execution capabilities of the plurality of computing devices;

select at least one sensor computing device from the plurality of computing devices for performing a data gathering part of a work item based on the context information corresponding to the sensor capabilities of the plurality of computing devices;

select at least one execution computing device from the plurality of computing devices to perform an execution part of the work item based on the context information corresponding to the execution capabilities of the plurality of computing devices;

assign performance of the data gathering part of a work item to one or more of the selected sensor computing devices; and assign performance of the execution part of the work item to one or more of the selected execution computing devices, wherein the data gathering part and the execution part correspond to cooperating portions of the work item.

2. The computing device of claim 1, wherein the processor is further configured to:

determine factors for selecting at least one computing devices for performing the data gathering part and execution part of the work item based on context data received from the plurality of computing devices;

select the at least one sensor computing device based on factors determined from context data of the at least one sensor computing device and context data of the at least one execution computing device; and select the at least one execution computing device based on factors determined from context data of the at least one sensor computing device and context data of the at least one execution computing device.

3. The computing device of claim 2, wherein the processor is further configured to determine the factors for selecting the computing devices based on factors determined from the context data received from the plurality of computing devices by:

identifying an accuracy of results for executing the work item based on an accuracy of at least one sensor at each of at least two computing devices of the plurality of computing devices;

identifying an accumulated latency for executing the work item by at least one computing device of the plurality of computing devices; and identifying an accumulated energy use for executing the work item by at least one computing devices of the plurality of computing devices.

4. The computing device of claim 3, wherein the processor is further configured to:

select the at least one sensor computing device using the factors determined from the context data of the at least one sensor computing device and the context data of the at least one execution computing device by selecting the at least one sensor computing device based on criteria of the accuracy of results for executing the work item, the accumulated latency for executing the work item, and the accumulated energy use for executing the work item; and select the at least one execution computing device using the factors determined from the context data of the at least one sensor computing device and the context data of the at least one execution computing device by selecting the at least one execution computing device based on the criteria of the accuracy of results for executing the work item, the accumulated latency for executing the work item, and the accumulated energy use for executing the work item.

5. The computing device of claim 4, wherein the criteria of the accuracy of results for executing the work item, the accumulated latency for executing the work item, and the accumulated energy use for executing the work item is based on weighted values for the accuracy of results for executing the work item, the accumulated latency for executing the work item, and the accumulated energy use for executing the work item.

6. The computing device of claim 2, wherein the processor is further configured to determine the factors for selecting the computing devices based on the context data received from the plurality of computing devices by:

calculating at least one estimate of data transfer latency between the at least one sensor computing device and the at least one execution computing device for executing the work item;

calculating at least one estimate of processing latency of the at least one execution computing device for executing the work item; and calculating at least one estimate of total latency for executing the work item based on the at least one estimate of data transfer latency and the at least one estimate of processing latency, and wherein the processor is further configured to select the at least one execution computing device having the at least one estimate of total latency that is at most a threshold latency for executing the work item.

7. The computing device of claim 2, wherein the processor is further configured to determine the factors for selecting the computing devices based on the context data received and from the plurality of computing devices by:

calculating at least one estimate of data transfer energy between the at least one sensor computing device and the at least one execution computing device for executing the work item;

calculating at least one estimate of processing energy of the at least one execution computing device for executing the work item; and calculating at least one estimate of total energy for executing the work item based on the at least one estimate of data transfer energy and the at least one estimate of processing energy.

8. The computing device of claim 7, wherein the processor is further configured to select the computing execution device having the at least one estimate of total energy that is at most a threshold energy for executing the work item.

9. The computing device of claim 7, wherein the processor is further configured to:

determine the factors for selecting the at least one execution computing device based on the context data received from the plurality of computing devices by estimating a battery level of the at least one execution computing device following executing the work item using the at least one estimate of total energy for executing the work item; and select the at least one execution computing device having the at least one estimate of the battery level of the at least one execution computing device following executing the work item that is at least a threshold battery level following executing the work item.

10. The computing device of claim 1, wherein the processor is further configure to:

identify at least one sensor of the at least one sensor computing device having at least a threshold sensor accuracy using sensor accuracy information from the context information received from the at least one sensor computing device; and select the at least one sensor computing device having the at least one sensor having at least the threshold sensor accuracy.

11. A method for distributing compute operation across connected computing devices, performed in a processor of a first computing device, the method comprising:

establishing an ad hoc communication connection with plurality of computing devices;

receiving context information from the plurality of computing devices via the ad hoc communication connection, wherein the context information includes sensor capabilities and execution capabilities of the plurality of computing devices;

selecting at least one sensor computing device from the plurality of computing devices for performing a data gathering part of a work item based on the context information corresponding to the sensor capabilities of the plurality of computing devices;

selecting at least one execution computing device from the plurality of computing devices based on the context information corresponding to the execution capabilities of the plurality of computing devices;

assigning performance of the data gathering part of a work item to one or more of the selected sensor computing devices; and assigning performance of the execution part of the work item to one or more of the selected execution computing devices, wherein the data gathering part and the execution part correspond to cooperating portions of the work item.

12. The method of claim 11, further comprising determining factors for selecting the computing devices based on the context information received from the plurality of computing devices, wherein:

selecting the at least one sensor computing device comprises selecting the at least one sensor computing device using factors determined from context data of the at least one sensor computing device and context data of the at least one execution computing device; and selecting the at least one execution computing device comprises selecting the at least one execution computing device using factors determined from context data of the at least one sensor computing device and context data of the at least one execution computing device.

13. The method of claim 12, wherein determining the factors for selecting the computing devices based on the context data received from the plurality of computing devices comprises:

identifying an accuracy of results for executing the work item based on an accuracy of at least one sensor at each of the plurality of computing devices;

identifying an accumulated latency for executing the work item by computing device of the plurality of computing devices; and identifying an accumulated energy use for executing the work item by computing device of the plurality of computing devices.

14. The method of claim 13, wherein:

selecting the at least one sensor computing device using the factors determined from the context data of the at least one sensor computing device and the context data of the at least one execution computing device comprises selecting the at least one sensor computing device based on criteria of the accuracy of results for executing the work item, the accumulated latency for executing the work item, and the accumulated energy use for executing the work item; and selecting the at least one execution computing device using the factors determined from the context data of the at least one sensor computing device and the context data of the at least one execution computing device comprises selecting the at least one execution computing device based on the criteria of the accuracy of results for executing the work item, the accumulated latency for executing the work item, and the accumulated energy use for executing the work item.

15. The method of claim 14, wherein the criteria of the accuracy of results for executing the work item, the accumulated latency for executing the work item, and the accumulated energy use for executing the work item is based on weighted values for the accuracy of results for executing the work item, the accumulated latency for executing the work item, and the accumulated energy use for executing the work item.

16. The method of claim 12, wherein determining the factors for selecting the computing devices based on the context data received from the plurality of computing devices comprises:

calculating at least one estimate of data transfer latency between the at least one sensor computing device and the at least one execution computing device for executing the work item;

calculating at least one estimate of processing latency of the at least one execution computing device for executing the work item; and calculating at least one estimate of total latency for executing the work item based on the at least one estimate of data transfer latency and the at least one estimate of processing latency, the method further comprising selecting the at least one execution computing device having the at least one estimate of total latency that is at most a threshold latency for executing the work item.

17. The method of claim 12, wherein determining the factors for selecting the at least one execution computing device based on the context data received from the plurality of computing devices comprises:

calculating at least one estimate of data transfer energy between the at least one sensor computing device and the at least one execution computing device for executing the work item;

calculating at least one estimate of processing energy of the at least one execution computing device for executing the work item; and calculating at least one estimate of total energy for executing the work item based on the at least one estimate of data transfer energy and the at least one estimate of processing energy.

18. The method of claim 17, further comprising, selecting the at least one execution computing device having the at least one estimate of total energy that is at most a threshold energy for executing the work item.

19. The method of claim 17, wherein determining the factors for selecting the at least one execution computing device based on the context data received from the plurality of computing devices comprises estimating a battery level of the at least one execution computing device following executing the work item using the at least one estimate of total energy for executing the work item, the method further comprising selecting the at least one execution computing device having the at least one estimate of the battery level of the at least one execution computing device following executing the work item that is at least a threshold battery level following executing the work item.

20. The method of claim 11, further comprising identifying at least one sensor of the at least one sensor computing device having at least a threshold sensor accuracy using sensor accuracy information from the context information received from the at least one sensor computing device, wherein selecting the at least one sensor computing device comprises selecting the at least one sensor computing device having the at least one sensor having at least the threshold sensor accuracy.

21. A computing device, comprising:

means for establishing an ad hoc communication connection with a plurality of computing devices within a network;

means for receiving context information from the plurality of computing devices via the ad hoc communication connection, wherein the context information includes sensor capabilities and execution capabilities of the plurality of computing devices;

means for selecting at least one sensor computing device from the plurality of computing devices to perform a data gathering part of a work item based on the context information corresponding to the sensor capabilities of the plurality of computing devices;

means for selecting at least one execution computing device from the plurality of computing devices to perform an execution part of the work item based on the context information corresponding to the execution capabilities of the plurality of computing devices;

means for assigning performance of the data gathering part of the work item to one or more of the selected sensor computing devices; and means for assigning performance of the execution part of the work item to one or more of the selected execution computing devices, wherein the data gathering part and the execution part correspond to cooperating portions of the work item.

22. The computing device of claim 21, further comprising means for determining factors for selecting computing devices based on the context information received from the plurality of computing devices, wherein:

the means for selecting the at least one sensor computing device comprises means for selecting the at least one sensor computing device using factors determined from context data received from the at least one sensor computing device and context data received from the at least one execution computing device; and the means for selecting the at least one execution computing device comprises means for selecting the at least one execution computing device using factors determined from context data received from the at least one sensor computing device and context data received from the at least one execution computing device.

23. The computing device of claim 22, wherein means for determining the factors for selecting the computing devices based on the context data received from the plurality of computing devices comprises:

means for identifying an accuracy of results for executing the work item based on an accuracy of at least one sensor at each of the plurality of computing devices;

means for identifying an accumulated latency for executing the work item by computing device of the plurality of computing devices; and means for identifying an accumulated energy use for executing the work item by computing device of the plurality of computing devices.

24. The computing device of claim 23, wherein:

means for selecting the at least one sensor computing device using the factors determined from the context data received from the at least one sensor computing device and the context data received from the at least one execution computing device comprises means for selecting the at least one sensor computing device based on criteria of the accuracy of results for executing the work item, the accumulated latency for executing the work item, and the accumulated energy use for executing the work item; and means for selecting the at least one execution computing device using the factors determined from the context data of the at least one sensor computing device and the context data of the at least one execution computing device comprises means for selecting the at least one execution computing device based on the criteria of the accuracy of results for executing the work item, the accumulated latency for executing the work item, and the accumulated energy use for executing the work item.

25. The computing device of claim 24, wherein the criteria of the accuracy of results for executing the work item, the accumulated latency for executing the work item, and the accumulated energy use for executing the work item is based on weighted values for the accuracy of results for executing the work item, the accumulated latency for executing the work item, and the accumulated energy use for executing the work item.

26. The computing device of claim 22, wherein means for determining the factors for selecting the at least one execution computing device based on the context data received from the plurality of computing devices comprises:

means for calculating at least one estimate of data transfer latency between the at least one sensor computing device and the at least one execution computing device for executing the work item;

means for calculating at least one estimate of processing latency of the at least one execution computing device for executing the work item; and means for calculating at least one estimate of total latency for executing the work item based on the at least one estimate of data transfer latency and the at least one estimate of processing latency, and wherein the computing device further comprising means for selecting the computing execution device having the at least one estimate of total latency that is at most a threshold latency for executing the work item.

27. The computing device of claim 22, wherein means for determining the factors for selecting the at least one execution computing device based on the context data received from the plurality of computing devices comprises:

means for calculating at least one estimate of data transfer energy between the at least one sensor computing device and the at least one execution computing device for executing the work item;

means for calculating at least one estimate of processing energy of the at least one execution computing device for executing the work item; and means for calculating at least one estimate of total energy for executing the work item based on the at least one estimate of data transfer energy and the at least one estimate of processing energy, and wherein the computing device further comprises means for selecting the at least one execution computing device having the at least one estimate of total energy that is at most a threshold energy for executing the work item.

28. The computing device of claim 27, wherein:

the means for determining the factors for selecting the at least one execution computing device based on the context data received from the plurality of computing devices comprises means for estimating a battery level of the at least one execution computing device following executing the work item using the at least one estimate of total energy for executing the work item; and the computing device further comprises means for selecting the at least one execution computing device having the at least one estimate of the battery level of the at least one execution computing device following executing the work item that is at least a threshold battery level following executing the work item.

29. The computing device of claim 21, further comprising means for identifying at least one sensor of the at least one sensor computing device having at least a threshold sensor accuracy using sensor accuracy information from the context information received from the at least one sensor computing device, wherein the means for selecting the at least one sensor computing device comprises means for selecting the at least one sensor computing device having the at least one sensor having at least the threshold sensor accuracy.

30. A non-transitory processor-readable medium having stored thereon processor-executable instructions configure to cause a computing device processor to perform operations comprising:

establishing an ad hoc communication connection with a plurality of computing devices within a network;

receiving context information from the plurality of computing devices via the ad hoc communication connection, wherein the context information includes sensor capabilities and execution capabilities of the plurality of computing devices;

selecting at least one sensor computing device from the plurality of computing devices for performing a data gathering part of a work item based on the context information corresponding to the sensor capabilities of the plurality of computing devices;

selecting at least one execution computing device from the plurality of computing devices to perform an execution part of the work item based on the context information corresponding to the execution capabilities of the plurality of computing devices;

assigning performance of the data gathering part of a work item to one or more of the selected sensor computing devices; and assigning performance of the execution part of the work item to one or more of the selected execution computing devices, wherein the data gathering part and the execution part correspond to cooperating portions of the work item.

\* \* \* \* \*